US012659851B2

(12) United States Patent
Elshafie et al.

(10) Patent No.: US 12,659,851 B2
(45) Date of Patent: Jun. 16, 2026

(54) RELAY NETWORK DEVICE FOR TRANSITIONING BETWEEN ENERGY STATES OF A NETWORK DEVICE

(71) Applicant: QUALCOMM Incorporated, San Diego, CA (US)

(72) Inventors: Ahmed Elshafie, San Diego, CA (US); Ahmed Attia Abotabl, San Diego, CA (US); Marwen Zorgui, San Diego, CA (US); Muhammad Sayed Khairy Abdelghaffar, San Jose, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 781 days.

(21) Appl. No.: 18/065,602

(22) Filed: Dec. 13, 2022

(65) Prior Publication Data

US 2024/0196321 A1 Jun. 13, 2024

(51) Int. Cl.
| | |
|---|---|
| *H04W 24/10* | (2009.01) |
| *H04B 7/155* | (2006.01) |
| *H04B 17/318* | (2015.01) |
| *H04B 17/336* | (2015.01) |
| *H04W 52/02* | (2009.01) |
| *H04W 74/0833* | (2024.01) |
| *H04W 88/04* | (2009.01) |

(52) U.S. Cl.
CPC ........ *H04W 52/0203* (2013.01); *H04B 7/155* (2013.01); *H04B 17/318* (2015.01); *H04B 17/336* (2015.01); *H04W 24/10* (2013.01); *H04W 74/0833* (2013.01); *H04W 88/04* (2013.01)

(58) Field of Classification Search
CPC ........................... H04B 7/026; H04B 7/15507
See application file for complete search history.

(56) References Cited

U.S. PATENT DOCUMENTS

| | | | | |
|---|---|---|---|---|
| 9,992,751 B1 * | 6/2018 | Manchanda | ........ | H04W 52/265 |
| 10,638,505 B1 * | 4/2020 | Manchanda | ...... | H04W 28/0278 |
| 2013/0040558 A1 * | 2/2013 | Kazmi | ............... | H04B 7/15507 455/7 |
| 2015/0045033 A1 * | 2/2015 | Kim | .................... | H04W 36/033 455/11.1 |
| 2015/0312799 A1 * | 10/2015 | Yang | .................. | H04B 7/15507 370/254 |
| 2015/0326302 A1 * | 11/2015 | Stojanovski | ........ | H04W 12/033 370/315 |
| 2016/0150373 A1 * | 5/2016 | Kim | ..................... | H04W 8/005 455/456.3 |
| 2018/0092139 A1 * | 3/2018 | Novlan | .................. | H04W 76/12 |
| 2021/0194569 A1 * | 6/2021 | Ray Chaudhuri | . | H04B 7/15507 |

* cited by examiner

*Primary Examiner* — Wen W Huang
(74) *Attorney, Agent, or Firm* — Polsinelli LLP

(57) ABSTRACT

Systems and techniques are provided for wireless communications. For example, a relay network device can determine that at least one user equipment (UE) is in a communication range of a relay network device and out of a communication range of a network device operating in a first energy state mode. The relay network device can obtain information associated with the at least one UE and can transmit, to the network device operating in the first energy state mode, a report comprising the information.

30 Claims, 12 Drawing Sheets

900

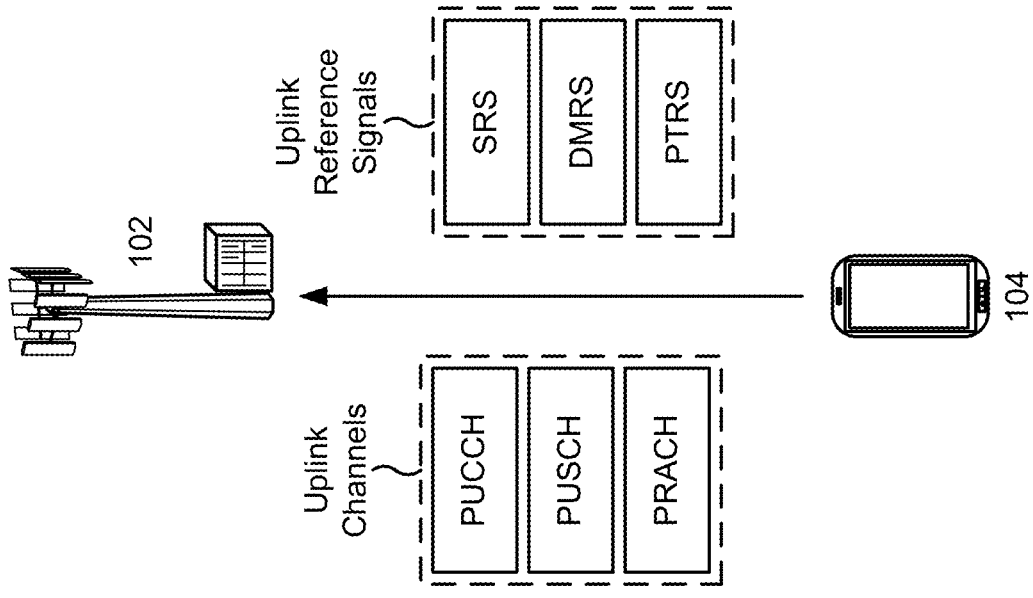
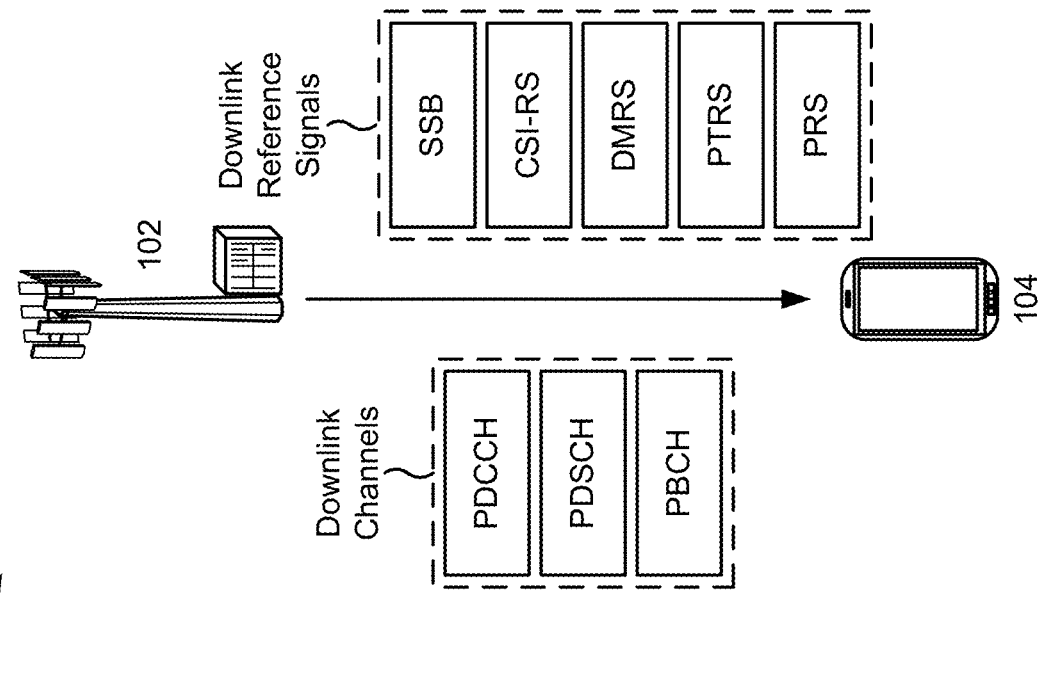
FIG. 5

900

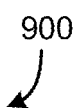

Transmit, To A Relay Node, An Assignment Of
Network Resources For At Least One Of Obtaining
Information Associated With At Least One User
Equipment (UE) In A Communication Range Of
The Relay Node And Out Of A Communication
Range Of The Network Device When Operating In
A First Energy State Mode
902

Transmit A Report Including The Information From
The Relay Node
904

Receive, When Operating In The First Energy State
Mode, A Report Including The Information From
The Relay Node
906

FIG. 9

1000
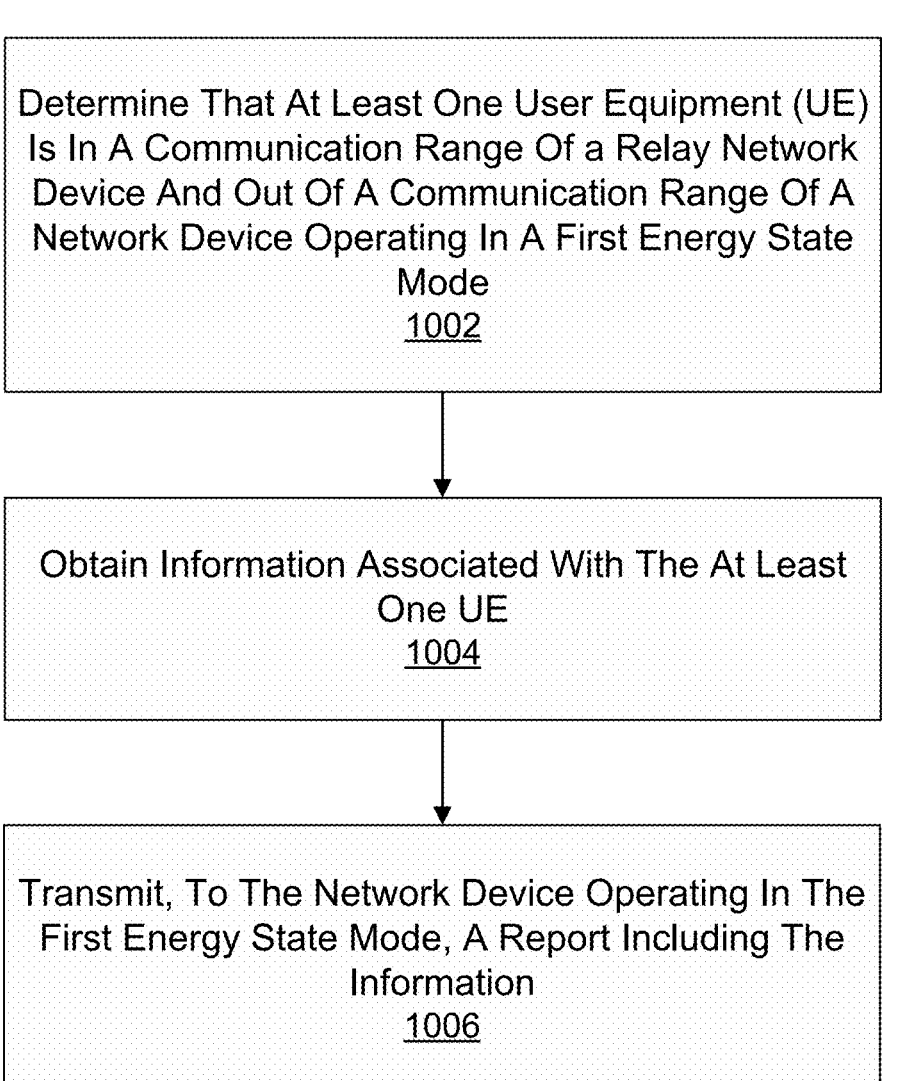
Determine That At Least One User Equipment (UE) Is In A Communication Range Of a Relay Network Device And Out Of A Communication Range Of A Network Device Operating In A First Energy State Mode
1002
Obtain Information Associated With The At Least One UE
1004
Transmit, To The Network Device Operating In The First Energy State Mode, A Report Including The Information
1006
FIG. 10

RELAY NETWORK DEVICE FOR TRANSITIONING BETWEEN ENERGY STATES OF A NETWORK DEVICE

FIELD

Aspects of the present disclosure generally relate to wireless communication. In some implementations, examples are described for various procedures associated with a communication network transitioning between energy states or energy saving modes using one or more network devices (e.g., a base station, a portion of a base station, a user equipment (UE), or other device), which may be referred to as relay nodes or relay units.

INTRODUCTION

Wireless systems are deployed to provide various telecommunication services, including telephony, video, data, messaging, broadcasts, among others. Wireless communications systems have developed through various generations, including a first-generation analog wireless phone service (1G), a second-generation (2G) digital wireless phone service (including interim 2.5G networks), a third-generation (3G) high speed data, Internet-capable wireless service, a fourth-generation (4G) service (e.g., Long-Term Evolution (LTE), WiMax), and a fifth-generation (5G) service (e.g., New Radio (NR)). There are presently many different types of wireless communications systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc. Energy usage in these various communication networks can be excessive in some cases.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below:

Disclosed are systems and techniques for performing wireless communication. For example, the systems and techniques can utilize one or more network devices (referred to as relay nodes) in a communication network when transitioning between energy states or energy state modes. In some cases, a base station of the network can transition from a high energy state mode to a low energy state mode. In such cases, UEs that were previously in communication range (or coverage) of the base station may become out of communication range of the base station, while other UEs may remain in communication range of the base station. According to aspects described herein, when a base station is operating in a low energy state mode, a relay node can be configured to relay information between the base station and an out-of-coverage UE (e.g., that is out of communication range of a base station but in coverage of the relay node). The relay node can be a UE, a base station (e.g., a gNB), a fixed station that uses limited energy relative to a base station, a portion of a base station (e.g., a central unit (CU), a distributed unit (DU), a radio unit (RU), a Near-Real Time (Near-RT) RAN Intelligent Controller (RIC), or a Non-Real Time (Non-RT) RIC of the base station), an Integrated Access and Backhaul (IAB), a non-RAN node, or other network device or network entity or other network device.

In some aspects, the relay node can obtain information associated with at least one UE and can transmit a report including the information to the base station. The information can include a number of UEs that are in the communication range with the apparatus, a respective position of each respective UE in the communication range of the apparatus, a respective pathloss associated with each respective UE in the communication range of the apparatus, a respective signal strength or quality (e.g., a reference signal received power (RSRP), a reference signal received quality (RSRQ), a signal-to-interference and noise ratio (SINR), etc.) of at least one signal received from a respective UE in the communication range of the apparatus, a respective type of data associated with each respective UE in the communication range of the apparatus, a priority or quality (e.g., a quality of service (QOS)) associated with the respective type of data of each respective UE in the communication range of the apparatus, any combination thereof, and/or other information.

In some aspects, a relay network device is provided for wireless communication. The relay network device includes: at least one memory; and at least one processor coupled to at least one memory and configured to: determine that at least one user equipment (UE) is in a communication range of the relay network device and out of a communication range of a network device operating in a first energy state mode: obtain information associated with the at least one UE; and transmit, to the network device operating in the first energy state mode, a report including the information.

In some aspects, a network device is provided for wireless communication in a network. The network device includes at least one memory and at least one processor coupled to at least one memory and configured to: transmit, to a relay network device, an assignment of network resources for at least one of obtaining information associated with at least one user equipment (UE) in a communication range of the relay network device and out of a communication range of the network device when operating in a first energy state mode or transmitting a report associated with the at least one UE; and receive, when operating in the first energy state mode, a report including the information from the relay network device.

In some aspects, a method of wireless communication performed by a relay device is provided. The method includes: determining that at least one user equipment (UE) is in a communication range of the relay network device and out of a communication range of a network device operating in a first energy state mode: obtaining information associated with the at least one UE; and transmitting, to the network device operating in the first energy state mode, a report including the information.

In some aspects, a method of wireless communication performed by a network device is provided. The method includes: transmitting, to a relay network device, an assignment of network resources for at least one of obtaining information associated with at least one user equipment (UE) in a communication range of the relay network device and out of a communication range of the network device when operating in a first energy state mode or transmitting a report associated with the at least one UE; and receiving, when operating in the first energy state mode, a report including the information from the relay network device.

In another example, an apparatus is provided that includes: means for determining that at least one user equipment (UE) is in a communication range of the relay network device and out of a communication range of a network device operating in a first energy state mode: means for obtaining information associated with the at least one UE; and means for transmitting, to the network device operating in the first energy state mode, a report including the information.

In another example, a non-transitory computer-readable medium is provided that has stored thereon instructions that, when executed by one or more processors, cause the one or more processors to: determine that at least one user equipment (UE) is in a communication range of a relay network device and out of a communication range of a network device operating in a first energy state mode: obtain information associated with the at least one UE; and transmit, to the network device operating in the first energy state mode, a report including the information.

In another example, an apparatus is provided that includes: means for transmitting, to a relay network device, an assignment of network resources for at least one of obtaining information associated with at least one user equipment (UE) in a communication range of the relay network device and out of a communication range of a network device when operating in a first energy state mode or transmitting a report associated with the at least one UE; and means for receiving, when operating in the first energy state mode, a report including the information from the relay network device.

In another example, a non-transitory computer-readable medium is provided that has stored thereon instructions that, when executed by one or more processors, cause the one or more processors to: transmit, to a relay network device, an assignment of network resources for at least one of obtaining information associated with at least one user equipment (UE) in a communication range of the relay network device and out of a communication range of a network device when operating in a first energy state mode or transmitting a report associated with the at least one UE; and receive, when operating in the first energy state mode, a report including the information from the relay network device.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof.

FIG. 5 is a diagram illustrating an example of physical channels and reference signals in a wireless network, in accordance with some examples:

FIG. 9 is a flow diagram illustrating an example of a process for wireless communications, in accordance with some examples:

FIG. 10 is a flow diagram illustrating another example of a process for wireless communications, in accordance with some examples.

DETAILED DESCRIPTION

Figure 1:
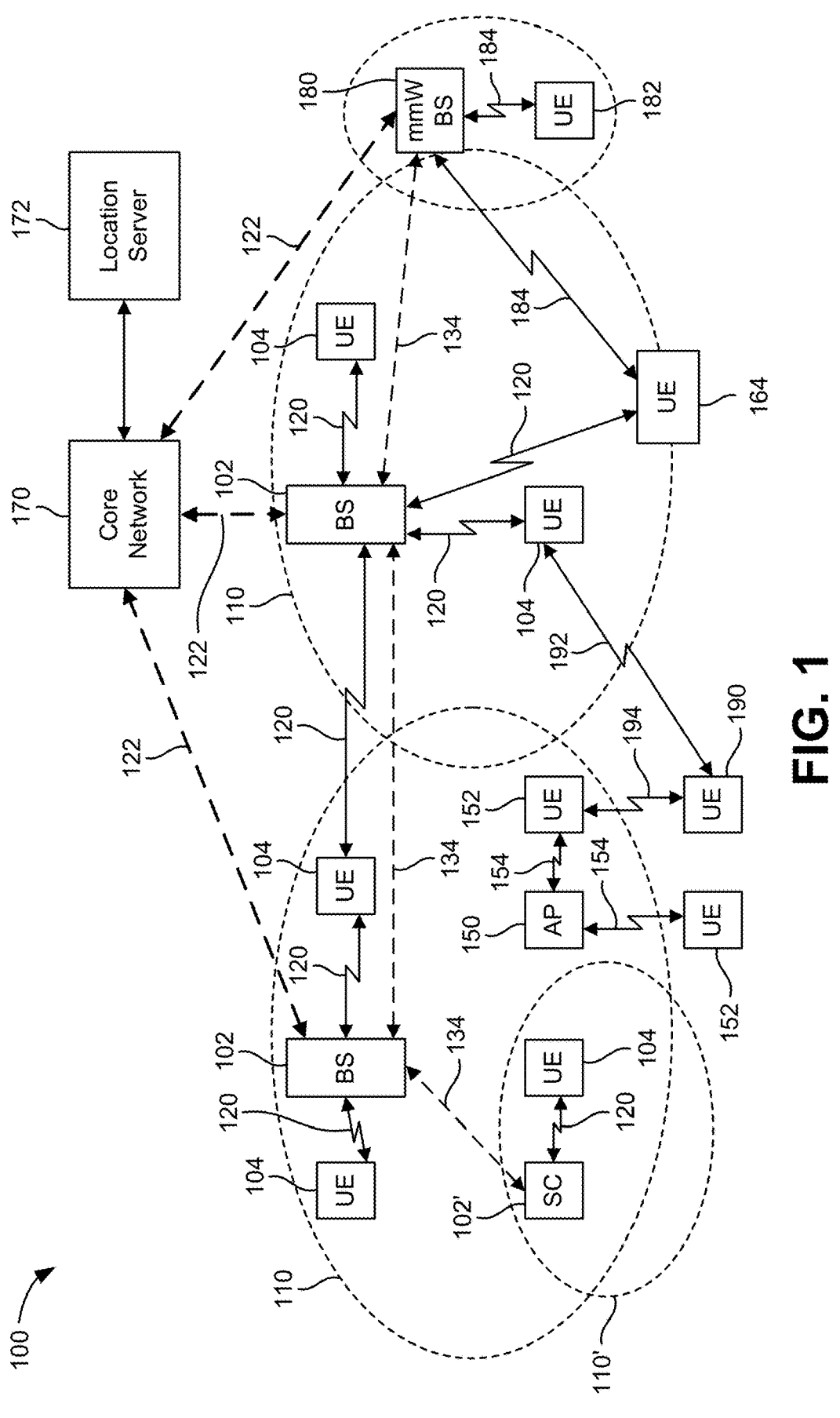
FIG. 1 is a block diagram illustrating an example of a wireless communication network, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Wireless communication networks can be deployed to provide various communication services, such as voice, video, packet data, messaging, broadcast, any combination thereof, or other communication services. A wireless communication network may support both access links and sidelinks for communication between wireless devices. An access link may refer to any communication link between a client device (e.g., a user equipment (UE), a station (STA), or other client device) and a base station (e.g., a 3GPP a New Radio (NR) Node B (also referred to as a gNB or gNodeB) for 5G/NR, a 3GPP eNodeB (eNB) for 4G/LTE, a Wi-Fi access point (AP), or other base station). For example, an access link may support uplink signaling, downlink signaling, connection procedures, etc. An example of an access link is a Uu link or interface (also referred to as an NR-Uu) between a 3GPP gNB and a UE.

Sidelink communications relate to a framework in which a wireless communications system includes two or more device, such as a relay node or one or more UEs that connect indirectly to one or more communication networks via one or more device-to-device (D2D) peer-to-peer (P2P) links. For example, a UE1-to-UE2 connection can be a sidelink in which, for example, UE2 can act as a relay node to communicate data from UE1 to a base station. A UE to relay node connection can also be a sidelink in which the relay node is a base station or fixed station and not another UE.

In various wireless communication networks, reference signals are transmitted and received via beams. In some examples, a beam may be generated using beamforming. Beamforming (e.g., which may also be referred to as spatial filtering, directional transmission, and/or directional reception) is a signal processing technique that may be used at a transmitting device or a receiving device (e.g., a base station or a UE) to shape or steer an antenna beam (e.g., a transmit beam or receive beam) along a spatial path between the transmitting device and the receiving device. Beamforming can be performed based on combining signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the transmitting device or receiving device. The adjustments associated with each of the antenna elements may be defined by a beamforming weight set associated with a particular orientation (e.g., with respect to the antenna array of the transmitting device or receiving device, or with respect to some other orientation).

In some examples, a base station may use multiple antennas or antenna arrays to conduct beamforming operations for directional communications with a UE. For example, one or more signals (e.g., synchronization signals, reference signals, beam management signals, and/or other control signals) may be transmitted by a base station multiple times in different directions, which may include a signal being transmitted according to different beamforming weight sets associated with different directions of transmission. Transmissions in different beam directions may be used to identify (e.g., by the base station or a receiving device (e.g., a UE)) a beam direction for subsequent transmission and/or reception by the base station. Some signals (e.g., such as data signals associated with a particular receiving device) may be transmitted by a base station in a single beam direction (e.g., a direction associated with the receiving device or UE). In some examples, the beam direction associated with transmissions along a single beam direction may be determined based on a signal that was transmitted in different beam directions. For example, a UE may receive one or more of the signals transmitted by the base station in different directions, and the UE may report to the base station an indication of the signal that the UE received with a highest signal quality. In some cases, the UE may report to the base station an indication of multiple signals received by the UE, along with an associated signal quality with which the UE received each respective signal of the multiple signals.

In some examples, downlink (DL) beam management (BM) can be performed to determine and/or select an optimal beam from a plurality of beams. For example, in 5G NR, DL beam management may be performed based on synchronization signal block (SSB) measurements and/or channel state information (CSI) reference signal (CSI-RS) measurements. A base station (e.g., gNB) can transmit multiple beams or resources in different directions and a UE can measure some (or all) of the beams transmitted by the base station. Each beam measured by the UE can be associated with a measurement value. For example, the UE can measure a reference signal received power (RSRP) value and/or a signal-to-interference-plus noise (SINR) value, among others. As noted below, systems and techniques described herein can utilize these values in the process of a network (e.g., a base station) transitioning from one energy state to another energy state, which can include the use of one or more relay nodes.

When managing the transition between different energy modes, the communication network can implement certain communication protocols or signaling for communicating data. In some cases, the UE can generate and transmit a Layer 1 (L1) (e.g., physical layer) measurement report on an uplink (UL) from the UE to the base station. An uplink channel may include a physical uplink control channel (PUCCH) that carries uplink control information (UCI), a physical uplink shared channel (PUSCH) that carries uplink data, or a physical random access channel (PRACH) used for initial network access, among other examples. In some examples, an L1 measurement report can include SSB and/or CSI-RS measurements (e.g., RSRP and/or SINR values) measured by the UE for corresponding SSB and/or CSI-RS beams or resources transmitted by the base station. The L1 measurement report can be transmitted on the uplink channel associated with the UE (e.g., on PUCCH or PUSCH). Based on receiving the L1 measurement report from the UE, the base station can determine information associated with one or more L1-RSRP or L1-SINR values measured by the UE and perform DL beam management to select a best or optimal beam for subsequent transmissions.

In some cases, DL beam management can be performed based on at least one demodulation reference signal (DMRS). For example, a base station (e.g., gNB) can transmit multiple DMRSs in different directions and using different beams or resources. A UE can measure an RSRP and/or SINR value and generate an L1 measurement report indicative of the DMRS measurement information determined at the UE. In some examples, mixed beam DL beam management can be performed based on a combination of DMRSs, SSBs, and/or CSI-RSs, wherein a UE measures an RSRP and/or SINR value for each respective DMRS, SSB, and/or CSI-RS beam or resource. An L1 measurement report can be generated indicative of the mixed beam measurement information determined at the UE and can subsequently be utilized to performed mixed beam DL beam management.

Transmitting L1 measurement reports can be associated with a large signaling overhead (e.g., between the UE and one or more base stations). For example, in some cases, an L1 measurement report may include 7 bits for the strongest measurements and 4 bits for each of the 3 remaining measurements (e.g., indicating a differential with regard to the strongest measurement). In some examples, multiple measurement reports (e.g., based on multiple reporting settings) may be sent in a single PUCCH or PUSCH. For example, the number of measurement reports that can be transmitted in a single PUCCH or PUSCH may be limited by the PUCCH/PUSCH payload size. If the payload size is not sufficient, then one or more measurements reports with a lowest priority may be dropped.

The cost for using energy to run a communication network is high. Typically, 23% of the total expenses relate to energy consumption. Most network energy consumption is from operating the radio access network (RAN), which can be approximately 50% of the costs in 5G, for example.

Systems, apparatuses, processes (also referred to as methods), and computer-readable media (collectively referred to as "systems and techniques") are described herein for utilizing one or more network devices (referred to as relay nodes) in a communication network when transitioning between energy states or energy state modes. For example, a relay node can conditionally relay information to and from an out-of-coverage UE (e.g., that is out of communication range of a base station but in coverage of the relay node) based on a transition of the base station to a low energy state mode. The relay node can be a base station (e.g., a gNB), a fixed station that uses limited energy relative to a base station, a portion of a base station (e.g., a central unit (CU), a distributed unit (DU), a radio unit (RU), a Near-Real Time (Near-RT) RAN Intelligent Controller (RIC), or a Non-Real Time (Non-RT) RIC of the base station), a UE, an Integrated Access and Backhaul (IAB), a non-RAN node, or other network device or network entity. In some cases, the relay node can act as a repeater.

The systems and techniques can be used to allow continued operation when transitioning a base station (or multiple base stations) from one energy state to another, such as from a low energy state mode to a high energy state mode. For example, given the signaling overhead and power necessary to communicate from a base station to many UEs, the base station can be configured to operate using different energy state modes for saving network power while maintaining network operations. The communication network may switch power modes in accordance with network input and/or current traffic conditions. For example, in low traffic conditions (e.g., when a low number of UEs are connected to the base station, such as less than 100 UEs), the communication network can transition to a low energy state mode, for example by activating less than all of the antennas on the base station (e.g., by turning on or off active antennas and/or transceiver units on one or more base stations), lowering a transmit power, adapting the available bandwidth for connected UEs, and/or performing other power savings operations.

When transitioning from one network energy state mode (such as a high energy state mode) to another energy state mode (such as a low energy state mode), the coverage of a cell associated with a base station can change, based on for example the communication network changing the number of antennas and/or transceiver units of a base station, lowering the transmit power of the base station, adapting the bandwidth of the base station, etc. For instance, when switching from a high energy state mode to a low energy state mode, some UEs that were previously in communication range (or coverage) of the base station may become out of communication range of the base station while other UEs may remain in communication range of the base station. The systems and techniques described herein improve on network energy savings in communication networks, which can further aid in adoption and expansion of such cellular networks.

For example, when a base station is operating in a low energy state mode, a relay node can be configured to relay information or data between the base station and at least one UE device in a communication range of the relay node and out of a communication range of the base station. The relay node can obtain information associated with the at least UE device and can transmit a report including the information to the base station. The information can include a number of UEs that are in the communication range with the apparatus, a respective position of each respective UE in the communication range of the apparatus, a respective pathloss associated with each respective UE in the communication range of the apparatus, a respective signal strength or quality (e.g., a reference signal received power (RSRP), a reference signal received quality (RSRQ), a signal-to-interference and noise ratio (SINR), etc.) of at least one signal received from a respective UE in the communication range of the apparatus, a respective type of data associated with each respective UE in the communication range of the apparatus, a priority or quality (e.g., a quality of service (QOS)) associated with the respective type of data of each respective UE in the communication range of the apparatus, any combination thereof, and/or other information.

While low and high energy state modes are described herein for illustrative purposes, the systems and techniques described herein can apply to networks that can transition between more than two energy states or modes, such as a low, medium, and high energy state modes.

Further aspects of the systems and techniques will be described with respect to the figures.

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), aircraft (e.g., an airplane, jet, unmanned aerial vehicle (UAV) or drone, helicopter, airship, glider, etc.), and/or Internet of Things (IOT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.), and so on.

A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (e.g., a network of spatially separated antennas connected to a common source via a transport medium) or a remote radio head (RRH) (e.g., a remote base station connected to a serving base station). Alternatively, the non-co-located physical TRPs may be the serving base station receiving the measurement report from the UE and a neighbor base station whose reference radio frequency (RF) signals (e.g., or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1 illustrates an example of a wireless communications system 100. The wireless communications system 100 (e.g., which may also be referred to as a wireless wide area network (WWAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally, or alternatively, one or more of the base stations 102 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 can include macro cell base stations (e.g., high power cellular base stations) and/or small cell base stations (e.g., low power cellular base stations). In an aspect, the macro cell base station may include eNBs and/or ng-eNBs where the wireless communications system 100 corresponds to a long-term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IOT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (e.g., also referred to as reverse link) transmissions from a UE 104 to a base station 102 and/or downlink (e.g., also referred to as forward link) transmissions from a base station 102 to a UE 104. The communication links 120 may use MIMO antenna technology, including spatial multiplexing, beamforming, and/or transmit diversity. The communication links 120 may be provided using one or more carrier frequencies. Allocation of carriers may be asymmetric with respect to downlink and uplink (e.g., a greater or lesser quantity of carriers may be allocated for downlink than for uplink).

Beamforming, which may also be referred to as spatial filtering, directional transmission, or directional reception, is a signal processing technique that may be used at a transmitting device or a receiving device (e.g., one or more of the base stations 102, UEs 104, etc.) to shape or steer an antenna beam (e.g., a transmit beam, a receive beam) along a spatial path between the transmitting device and the receiving device. Beamforming may be implemented based on combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A transmitting device and/or a receiving device (e.g., such as one or more of base stations 102 and/or UEs 104) may use beam sweeping techniques as part of beam forming operations. For example, a base station 102 (e.g., or other transmitting device) may use multiple antennas or antenna arrays (e.g., antenna panels) to conduct beamforming operations for directional communications with a UE 104 (e.g., or other receiving device). Some signals (e.g., synchronization signals, reference signals, beam selection signals, or other control signals) may be transmitted by base station 102 (or other transmitting device) multiple times in different directions. For example, the base station 102 may transmit a signal according to different beamforming weight sets associated with different directions of transmission. Transmissions in different beam directions may be used to identify (e.g., by a transmitting device, such as a base station 102, or by a receiving device, such as a UE 104) a beam direction for later transmission or reception by the base station 102.

Some signals, such as data signals associated with a particular receiving device, may be transmitted by a base station 102 in a single beam direction (e.g., a direction associated with the receiving device, such as a UE 104). In some examples, the beam direction associated with transmissions along a single beam direction may be determined based on a signal that was transmitted in one or more beam directions. For example, a UE 104 may receive one or more of the signals transmitted by the base station 102 in different directions and may report to the base station 104 an indication of the signal that the UE 104 received with a highest signal quality or an otherwise acceptable signal quality.

In some examples, transmissions by a device (e.g., by a base station 102 or a UE 104) may be performed using multiple beam directions, and the device may use a combination of digital precoding or radio frequency beamforming to generate a combined beam for transmission (e.g., from a base station 102 to a UE 104, from a transmitting device to a receiving device, etc.). The UE 104 may report feedback that indicates precoding weights for one or more beam directions, and the feedback may correspond to a configured number of beams across a system bandwidth or one or more sub-bands. The base station 102 may transmit a reference signal (e.g., a cell-specific reference signal (CRS), a channel state information reference signal (CSI-RS), etc.), which may be precoded or unprecoded. The UE 104 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 102, a UE 104 may employ similar techniques for transmitting signals multiple times in different directions (e.g., for identifying a beam direction for subsequent transmission or reception by the UE 104) or for transmitting a signal in a single direction (e.g., for transmitting data to a receiving device).

A receiving device (e.g., a UE 104) may try multiple receive configurations (e.g., directional listening) when receiving various signals from the base station 102, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may further include a WLAN AP 150 in communication with WLAN stations (STAs) 152 via communication links 154 in an unlicensed frequency spectrum (e.g., 5 Gigahertz. (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc., utilizing the ultra-wideband (UWB) spectrum. The UWB spectrum can range from 3.1 to 10.5 GHZ.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHZ with a wavelength of 100 millimeters. The super high frequency (SHF) band extends between 3 GHz and 30 GHZ, also referred to as centimeter wave. Communications using the mmW and/or near mmW radio frequency band have high path loss and a relatively short range. The mmW base station 180 and the UE 182 may utilize beamforming (e.g., transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (e.g., from 450 to 6,000 Megahertz (MHz)), FR2 (e.g., from 24,250 to 52,600 MHz), FR3 (e.g., above 52,600 MHZ), and FR4 (e.g., between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (e.g., whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHZ (e.g., x component carriers) for transmission in each direction. The component carriers may or may not be adjacent to each other on the frequency spectrum. Allocation of carriers may be asymmetric with respect to the downlink and uplink (e.g., a greater or lesser quantity of carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (e.g., 40 MHz), compared to that attained by a single 20 MHz carrier.

In order to operate on multiple carrier frequencies, a base station 102 and/or a UE 104 can be equipped with multiple receivers and/or transmitters. For example, a UE 104 may have two receivers, "Receiver 1" and "Receiver 2," where "Receiver 1" is a multi-band receiver that can be tuned to band (e.g., carrier frequency) 'X' or band 'Y,' and "Receiver 2" is a one-band receiver tunable to band 'Z' only. In this example, if the UE 104 is being served in band 'X,' band 'X' would be referred to as the PCell or the active carrier frequency, and "Receiver 1" would need to tune from band 'X' to band 'Y' (e.g., an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (e.g., referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (e.g., through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
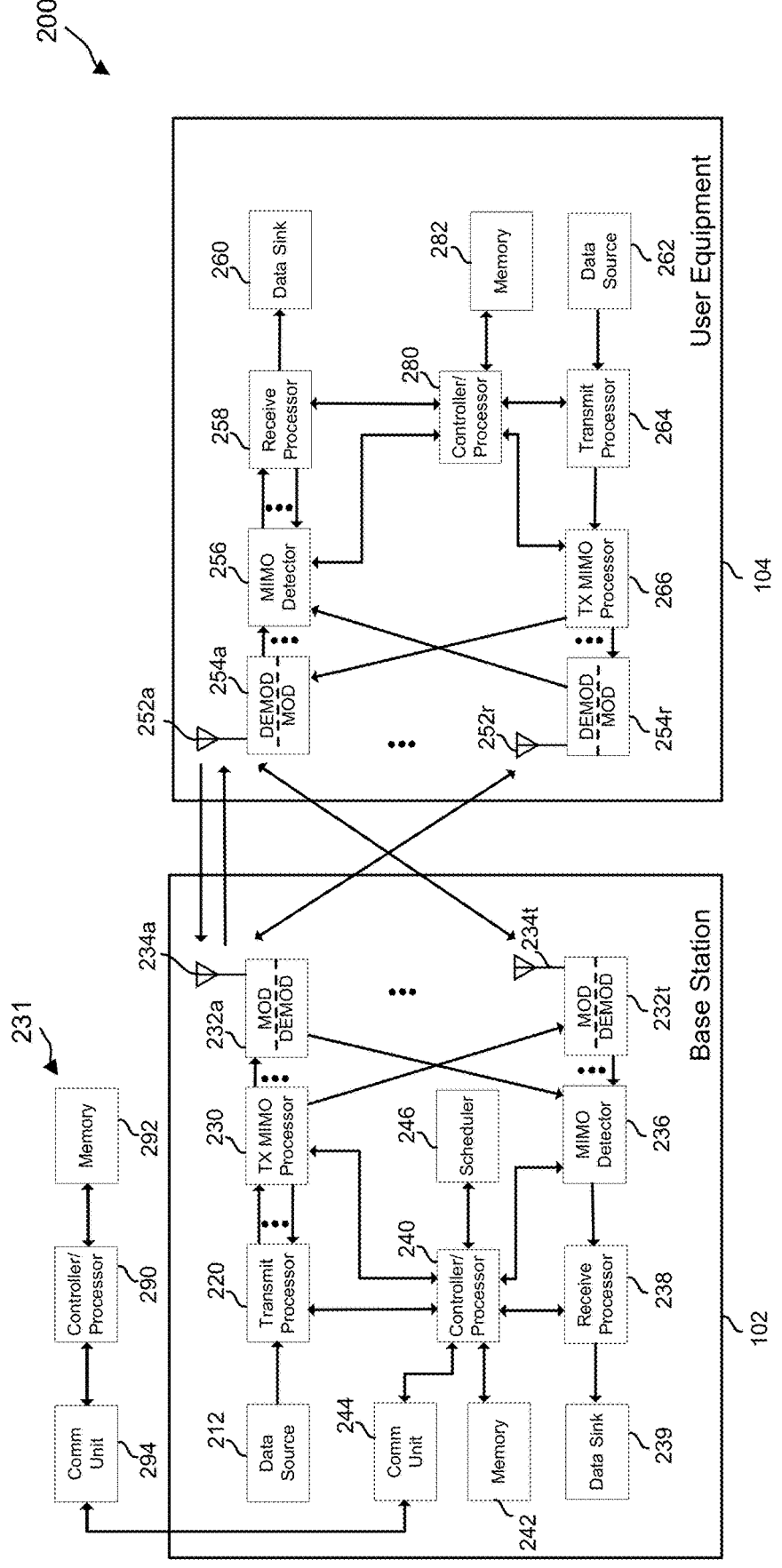
FIG. 2 is a diagram illustrating a design of a base station and a user equipment (UE) device that enable transmission and processing of signals exchanged between the UE and the base station, in accordance with some examples.

FIG. 2 illustrates a block diagram of an example architecture 200 of a base station 102 and a UE 104 that enables transmission and processing of signals exchanged between the UE and the base station, in accordance with some aspects of the present disclosure. Example architecture 200 includes components of a base station 102 and a UE 104, which may be one of the base stations 102 and one of the UEs 104 illustrated in FIG. 1. Base station 102 may be equipped with T antennas 234a through 234t, and UE 104 may be equipped with R antennas 252a through 252r, where in general T≥1 and R≥1.

At base station 102, a transmit processor 220 may receive data from a data source 212 for one or more UEs, select one or more modulation and coding schemes (MCS) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. The modulators 232a through 232t are shown as a combined modulator-demodulator (MOD-DEMOD). In some cases, the modulators and demodulators can be separate components. Each modulator of the modulators 232a to 232t may process a respective output symbol stream (e.g., for an orthogonal frequency-division multiplexing (OFDM) scheme and/or the like) to obtain an output sample stream. Each modulator of the modulators 232a to 232t may further process (e.g., convert to analog, amplify, filter, and upconvert) the output sample stream to obtain a downlink signal. T downlink signals may be transmitted from modulators 232a to 232t via T antennas 234a through 234t, respectively. According to certain aspects described in more detail below, the synchronization signals can be generated with location encoding to convey additional information.

At UE 104, antennas 252a through 252r may receive the downlink signals from base station 102 and/or other base stations and may provide received signals to one or more demodulators (DEMODs) 254a through 254r, respectively. The demodulators 254a through 254r are shown as a combined modulator-demodulator (MOD-DEMOD). In some cases, the modulators and demodulators can be separate components. Each demodulator of the demodulators 254a through 254r may condition (e.g., filter, amplify, downconvert, and digitize) a received signal to obtain input samples. Each demodulator of the demodulators 254a through 254r may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based on a beta value or a set of beta values associated with the one or more reference signals). The symbols from transmit processor 264 may be precoded by a TX-MIMO processor 266, further processed by modulators 254a through 254r (e.g., for DFT-s-OFDM, CP-OFDM, and/or the like), and transmitted to base station 102. At base station 102, the uplink signals from UE 104 and other UEs may be received by antennas 234a through 234t, processed by demodulators 232a through 232t, detected by a MIMO detector 236 (e.g., if applicable), and further processed by a receive processor 238 to obtain decoded data and control information sent by UE 104. Receive processor 238 may provide the decoded data to a data sink 239 and the decoded control information to controller (e.g., processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (e.g., such as a Node B (NB), evolved NB (eNB), NR BS, 5G NB, access point (AP), a transmit receive point (TRP), or a cell, etc.) may be implemented as an aggregated base station (e.g., also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (e.g., such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (e.g., such as the network configuration sponsored by the O-RAN Alliance)), or a virtualized radio access network (e.g., vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
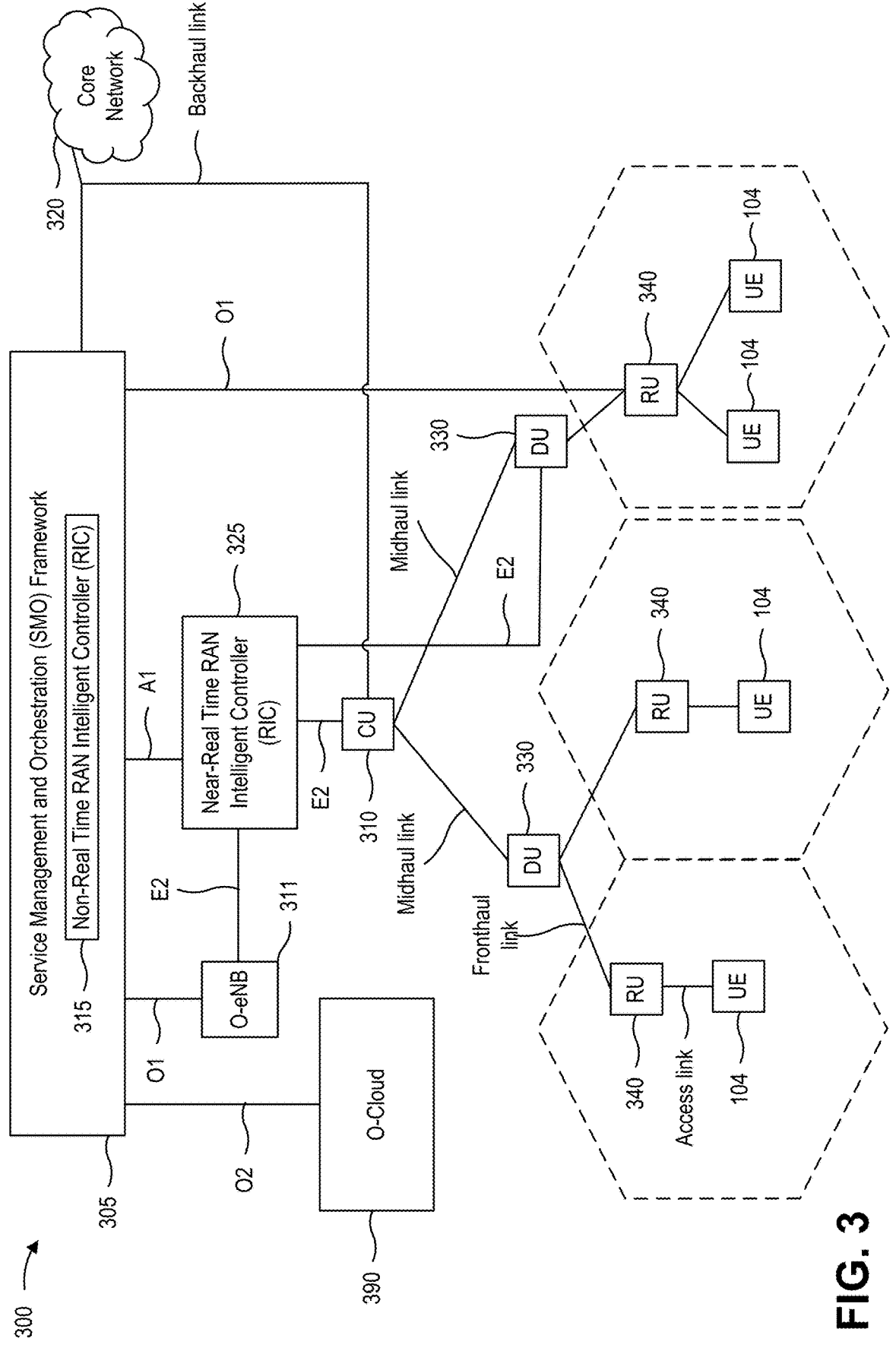
FIG. 3 is a diagram illustrating an example of a disaggregated base station, in accordance with some examples.

FIG. 3 is a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (e.g., such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUS) 340 via respective fronthaul links. The RUs 340 may communicate with respective UEs 104 via one or more radio frequency (RF) access links. In some implementations, the UE 104 may be simultaneously served by multiple RUs 340.

Each of the units (e.g., the CUS 310, the DUs 330, the RUs 340, as well as the Near-RT RICs 325, the Non-RT RICs 315, and the SMO Framework 305) illustrated in FIG. 3 and/or described herein may include one or more interfaces or be coupled to one or more interfaces configured to receive or transmit signals, data, or information (e.g., collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (e.g., such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330) may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (e.g., such as modules for forward error correction (FEC) encoding and decoding, scrambling, modulation and demodulation, or the like) depending on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (e.g., such as performing fast Fourier transform (FFT), inverse FFT (iFFT), digital beamforming, physical random-access channel (PRACH) extraction and filtering, or the like), or both, based on the functional split, such as a lower layer functional split. In such an architecture, the RU(s) 340 can be implemented to handle over the air (OTA) communication with one or more UEs 104. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (e.g., such as an O1 interface). For virtualized network elements, the SMO Framework 305 may be configured to interact with a cloud computing platform (e.g., such as an open cloud (O-Cloud) 390) to perform network element life cycle management (e.g., such as to instantiate virtualized network elements) via a cloud computing platform interface (e.g., such as an O2 interface). Such virtualized network elements can include, but are not limited to, CUs 310, DUs 330, RUS 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (e.g., such as via an A1 interface) the Near-RT RIC 325. The Near-RT RIC 325 may be configured to include a logical function that enables near-real-time control and optimization of RAN elements and resources via data collection and actions over an interface (e.g., such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (e.g., such as reconfiguration via O1) or via creation of RAN management policies (e.g., such as A1 policies).

Figure 4:
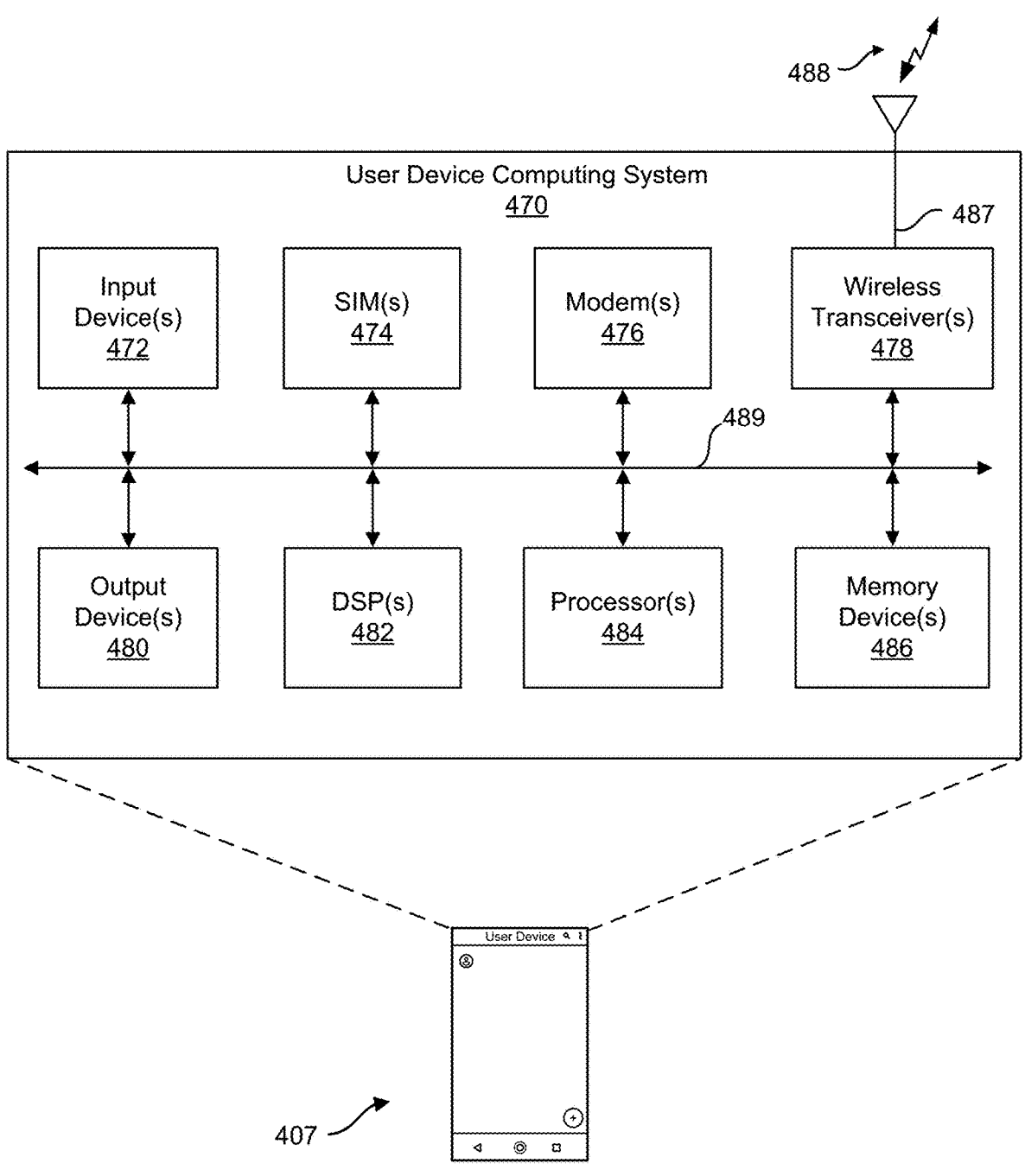
FIG. 4 is a block diagram illustrating components of a user equipment (UE), in accordance with some examples.

FIG. 4 illustrates an example of a computing system 470 of a wireless device 407. The wireless device 407 may include a client device such as a UE (e.g., UE 104, UE 152, UE 190) or other type of device (e.g., a station (STA) configured to communication using a Wi-Fi interface) that may be used by an end-user. For example, the wireless device 407 may include a mobile phone, router, tablet computer, laptop computer, tracking device, wearable device (e.g., a smart watch, glasses, an extended reality (XR) device such as a virtual reality (VR), augmented reality (AR), or mixed reality (MR) device, etc.), Internet of Things (IOT) device, a vehicle, an aircraft, and/or another device that is configured to communicate over a wireless communications network. The computing system 470 includes software and hardware components that may be electrically or communicatively coupled via a bus 489 (e.g., or may otherwise be in communication, as appropriate). For example, the computing system 470 includes one or more processors 484. The one or more processors 484 may include one or more CPUs, ASICS, FPGAs, APs, GPUs, VPUs, NSPs, microcontrollers, dedicated hardware, any combination thereof, and/or other processing device or system. The bus 489 may be used by the one or more processors 484 to communicate between cores and/or with the one or more memory devices 486.

The computing system 470 may also include one or more memory devices 486, one or more digital signal processors (DSPs) 482, one or more SIMs 474, one or more modems 476, one or more wireless transceivers 478, an antenna 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 may include one or more radio frequency (RF) interfaces configured to transmit and/or receive RF signals. In some examples, an RF interface may include components such as modem(s) 476, wireless transceiver(s) 478, and/or antennas 487. The one or more wireless transceivers 478 may transmit and receive wireless signals (e.g., signal 488) via antenna 487 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 470 may include multiple antennas or an antenna array that may facilitate simultaneous transmit and receive functionality. Antenna 487 may be an omnidirectional antenna such that radio frequency (RF) signals may be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a sidelink interface such as a PC5 interface, a dedicated short range communication (DSRC) interface, etc.). Wireless transceivers 478 may be configured to transmit RF signals for performing sidelink communications via antenna 487 in accordance with one or more transmit power parameters that may be associated with one or more regulation modes. Wireless transceivers 478 may also be configured to receive sidelink communication signals having different signal parameters from other wireless devices.

In some examples, the one or more wireless transceivers 478 may include an RF front end including one or more components, such as an amplifier, a mixer (e.g., also referred to as a signal multiplier) for signal down conversion, a frequency synthesizer (e.g., also referred to as an oscillator) that provides signals to the mixer, a baseband filter, an analog-to-digital converter (ADC), one or more power amplifiers, among other components. The RF front-end may generally handle selection and conversion of the wireless signals 488 into a baseband or intermediate frequency and may convert the RF signals to the digital domain.

In some cases, the computing system 470 may include a coding-decoding device (or CODEC) configured to encode and/or decode data transmitted and/or received using the one or more wireless transceivers 478. In some cases, the computing system 470 may include an encryption-decryption device or component configured to encrypt and/or decrypt data (e.g., according to the AES and/or DES standard) transmitted and/or received by the one or more wireless transceivers 478.

The one or more SIMs 474 may each securely store an international mobile subscriber identity (IMSI) number and related key assigned to the user of the wireless device 407. The IMSI and key may be used to identify and authenticate the subscriber when accessing a network provided by a network service provider or operator associated with the one or more SIMs 474. The one or more modems 476 may modulate one or more signals to encode information for transmission using the one or more wireless transceivers 478. The one or more modems 476 may also demodulate signals received by the one or more wireless transceivers 478 in order to decode the transmitted information. In some examples, the one or more modems 476 may include a Wi-Fi modem, a 4G (or LTE) modem, a 5G (or NR) modem, and/or other types of modems. The one or more modems 476 and the one or more wireless transceivers 478 may be used for communicating data for the one or more SIMs 474.

The computing system 470 may also include (and/or be in communication with) one or more non-transitory machine-readable storage media or storage devices (e.g., one or more memory devices 486), which may include, without limitation, local and/or network accessible storage, a disk drive, a drive array, an optical storage device, a solid-state storage device such as a RAM and/or a ROM, which may be programmable, flash-updateable, and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 486 and executed by the one or more processor(s) 484 and/or the one or more DSPs 482. The computing system 470 may also include software elements (e.g., located within the one or more memory devices 486), including, for example, an operating system, device drivers, executable libraries, and/or other code, such as one or more application programs, which may comprise computer programs implementing the functions provided by various aspects, and/or may be designed to implement methods and/or configure systems, as described herein.

FIG. 5 is a diagram illustrating an example 500 of physical channels and reference signals in a wireless network. In some examples, one or more downlink channels and one or more downlink reference signals may carry information from a base station 102 to a UE 104. One or more uplink channels and one or more uplink reference signals may carry information from UE 104 to base station 102.

In some aspects, a downlink channel may include one or more of a physical downlink control channel (PDCCH) that carries downlink control information (DCI), a physical downlink shared channel (PDSCH) that carries downlink data, and/or a physical broadcast channel (PBCH) that carries system information, among other examples. In some aspects, PDSCH communications may be scheduled by PDCCH communications.

In some examples, an uplink channel may include one or more of a physical uplink control channel (PUCCH) that carries uplink control information (UCI), a physical uplink shared channel (PUSCH) that carries uplink data, and/or a physical random access channel (PRACH) used for initial network access, among other examples. In some aspects, UE 104 may transmit acknowledgement (ACK) or negative acknowledgement (NACK) feedback (e.g., ACK/NACK feedback or ACK/NACK information) in UCI on the PUCCH and/or the PUSCH.

In some cases, a downlink reference signal may include one or more of a synchronization signal block (SSB), a channel state information (CSI) reference signal (CSI-RS), a demodulation reference signal (DMRS), a positioning reference signal (PRS), and/or a phase tracking reference signal (PTRS), among other examples. In some examples, an uplink reference signal may include one or more of a sounding reference signal (SRS), a DMRS, and/or a PTRS, among other examples.

An SSB may carry or include information used for initial network acquisition and synchronization. For example, an SSB can carry or include one or more of a primary synchronization signal (PSS), a secondary synchronization signal (SSS), a PBCH, and/or a PBCH DMRS. An SSB may also be referred to as a synchronization signal/PBCH (SS/PBCH) block. In some aspects, base station 102 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. For example, base station 102 can configure a set of CSI-RSs for UE 104, and UE 104 can measure the configured set of CSI-RSs. Based on the CSI-RS measurements, UE 104 can perform channel estimation and report channel estimation parameters to base station 102 (e.g., in a CSI report). For example, the channel estimation parameters can include one or more of a channel quality indicator (CQI), a precoding matrix indicator (PMI), a CSI-RS resource indicator (CRI), a layer indicator (L1), a rank indicator (RI), and/or a reference signal received power (RSRP), among other examples.

In some examples, base station 102 can use the CSI report to select transmission parameters for downlink communications to UE 104. For example, base station 102 can use the CSI report to select transmission parameters that include one or more of a quantity of transmission layers (e.g., a rank), a precoding matrix (e.g., a precoder), a modulation and coding scheme (MCS), and/or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS can carry information used to compensate for oscillator phase noise. In some cases, oscillator phase noise may increase as an oscillator carrier frequency increases. In some examples, a PTRS can be utilized at high carrier frequencies (e.g., such as millimeter wave frequencies) to mitigate oscillator phase noise. The PTRS may be used to track the phase of the local oscillator and to enable suppression of phase noise and common phase error (CPE). As illustrated in FIG. 5, in some examples one or more PTRSs can be used for both downlink communications (e.g., on the PDSCH) and uplink communications (e.g., on the PUSCH).

A PRS may carry information associated with timing or ranging measurements of UE 104. For example, UE 104 may utilize one or more signals (e.g., PRSs) transmitted by base station 102 to improve an observed time difference of arrival (OTDOA) positioning performance. In some examples, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). A PRS can be designed to improve detectability by UE 104, which may need to detect downlink signals from multiple neighboring base stations in order to perform OTDOA-based positioning. Accordingly, UE 104 may receive a PRS from multiple cells (e.g., a reference cell and one or more neighbor cells), and may report a reference signal time difference (RSTD) based on OTDOA measurements associated with the PRSs received from the multiple cells. In some aspects, base station 102 can calculate a position of UE 104 based on the RSTD measurements reported by UE 104.

In some examples, an SRS can carry information used for uplink channel estimation, which may be used for scheduling, link adaptation, precoder selection, and/or beam management, among other examples. Base station 102 can configure one or more SRS resource sets for UE 104, and UE 104 can transmit SRSs on the configured SRS resource sets. An SRS resource set may have a configured usage, such as uplink CSI acquisition, downlink CSI acquisition for reciprocity-based operations, uplink beam management, among other examples. Base station 102 may measure the SRSs, may perform channel estimation based on the measurements, and/or may use the SRS measurements to configure communications with UE 104.

Figure 6A:
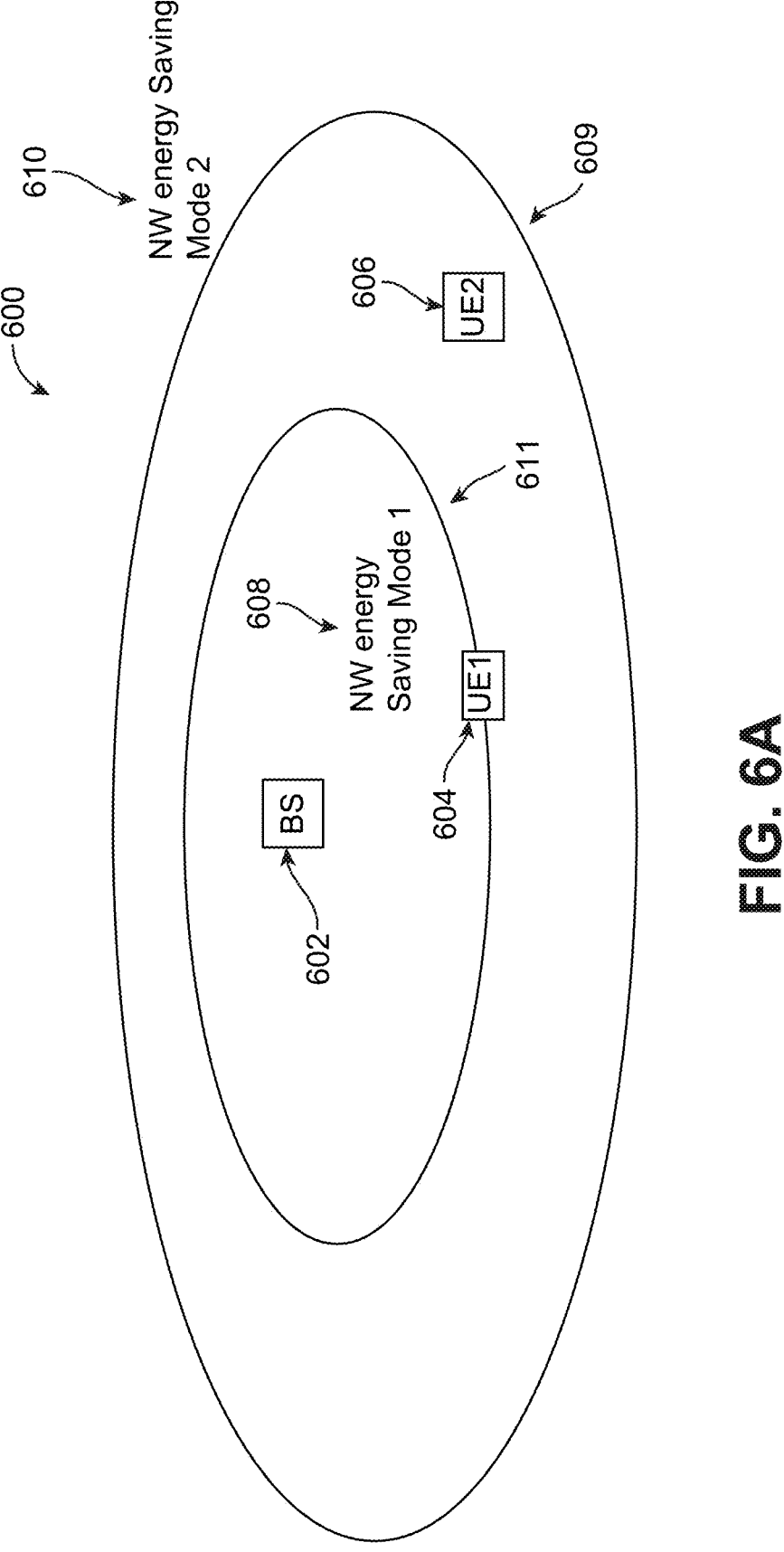
FIG. 6A is a diagram illustrating a communication network showing a base station in a first energy state mode and a second energy state mode, in accordance with some examples.

As previously described, a base station of a wireless communications system (e.g., base station 102 of wireless communications system 100) can transition between energy state modes, such as from a high energy state mode to a low energy state mode. FIG. 6A is a diagram 600 illustrating a communication network including a base station 602 and a representation of a communication range 609 of the base station 602 when operating in a first energy state mode 608 and a communication range 611 of the base station 602 when operating in a second energy state mode 610. In the first energy state mode 608, which can be considered a low energy state mode, the UE 604 can communicate with the base station 602 but the signal energy used by the base station is not powerful enough to communicate with the more distant UE 606. The second energy state mode 610 requires higher power to communicate with the UE 606. As noted above, one of the challenges of changing energy modes is that some UEs 606 might be out-of-coverage because they are too far away from the base station 602 and thus are not within the communication range 611 when the base station 602 is operating in the first energy state mode 608.

Figure 6B:
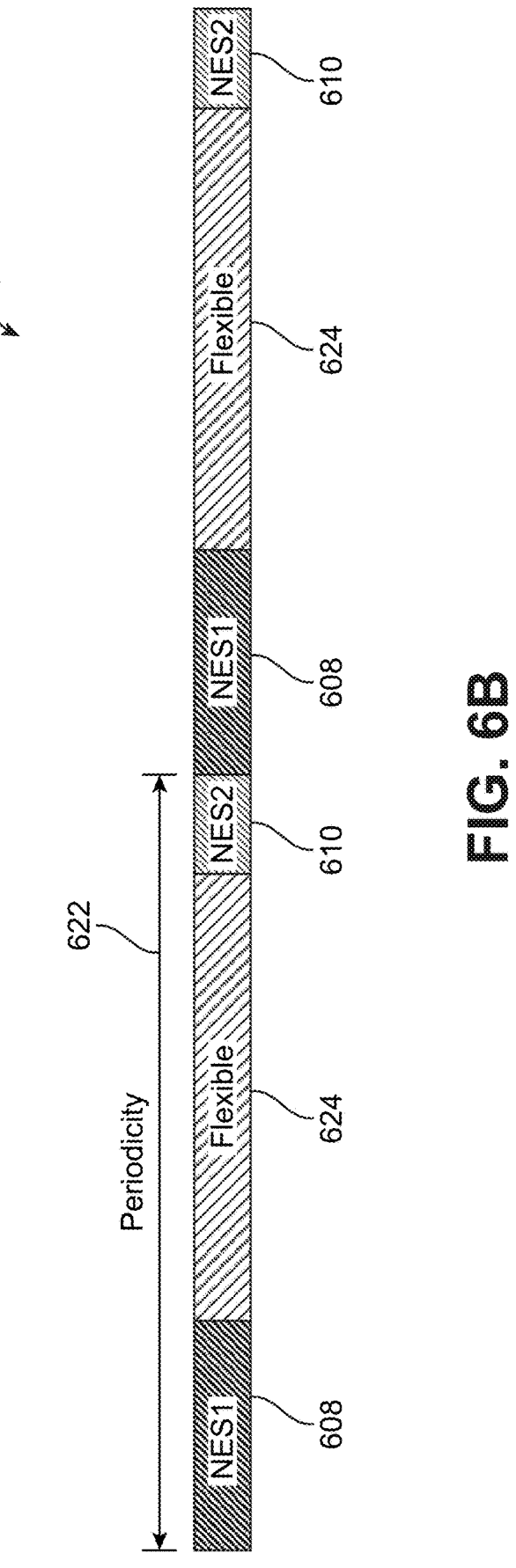
FIG. 6B is a diagram illustrating transitions from between different energy state modes in a communication network, in accordance with some examples.

FIG. 6B is a diagram 620 illustrating transitions from between different energy state modes in a communication network. The diagram 620 illustrates how, over time or at a certain periodicity 622, the network operation can adjust to particular energy state modes. For example, a first network energy state 1 (NES1) 608 can represent a network energy state mode in which the energy usage is relatively low and the network may use one or more relay nodes to enable UEs out of communication distance with the base station 602 to nevertheless have a certain level of communication. This mode can be operative for a period of time. Then the communication network may transition to a flexible mode 624 in which the system is configured for a period of time to dynamically adjust energy modes as indicated by the network depending on one or more factors such as traffic conditions, quality of service of UEs, priority of UEs, a status of emergency conditions, type of data requests (e.g., streaming video conferencing data, texting data, internet access, and so forth) and cost of energy status. The system may then transition to a NES2 610 mode which can be, for example, a relatively high energy use mode. At the end of the predetermined period 622, the cycle of energy modes can begin again at NES1 608, the flexible mode 624 and then the NES2 mode 1610.

The timing of these different energy modes can also be based on historical usage or predicted usage information. For example, the NES2 610 mode can be scheduled for use during a traditionally high data volume time of day, such as during a commute in a large metropolitan area or during a scheduled event in which many UEs 606 will be expected to access the Internet or a data service.

Figure 7:
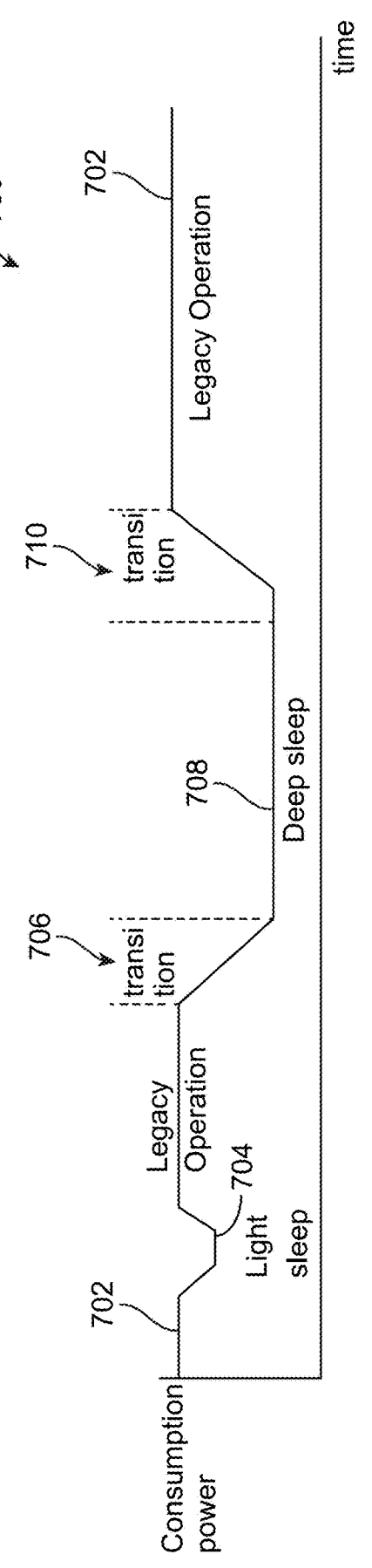
FIG. 7 is a diagram illustrating transitions between a light sleep mode, a legacy operation and a deep sleep mode in a communication network, in accordance with some examples.

FIG. 7 is a diagram 700 illustrating transitions between a light sleep mode, a legacy operation and a deep sleep mode in a communication network. Time is along the x-axis and power consumption is along the y-axis. Network power savings can take different modes or operations to save power while maintaining network operation. In one example, the network can enter into different sleep mode based on traffic. A legacy operation mode 702 represents the standard full operation of the network. The network can transition to a light sleep mode 704 if the traffic is light.

When the traffic use increases, the network can transition back to the legacy operation 702. If the traffic gets even more light, the network can transition 706 to a deep sleep mode 208 for a period of time and then transition 710 back to the legacy operation 702. Sleep modes can be different in terms of operation. For example, some sleep modes will turn of the radio frequency chains while other sleep modes will not.

Different sleep modes can have different power consumption and require different transitioning times. The systems and techniques described herein introduce new operations using different types of relay nodes (e.g., low-cost amplifier and forward (AF) and decode and forward (DF) units, relays or repeaters, integrated access and backhauls (IABs), reconfigurable intelligent surfaces (RISs), UEs) to act as relay for other UEs 606 for certain energy state modes. These relay nodes can operate with functions disclosed herein during the transitions 706, 710 shown in FIG. 7.

Figure 8:
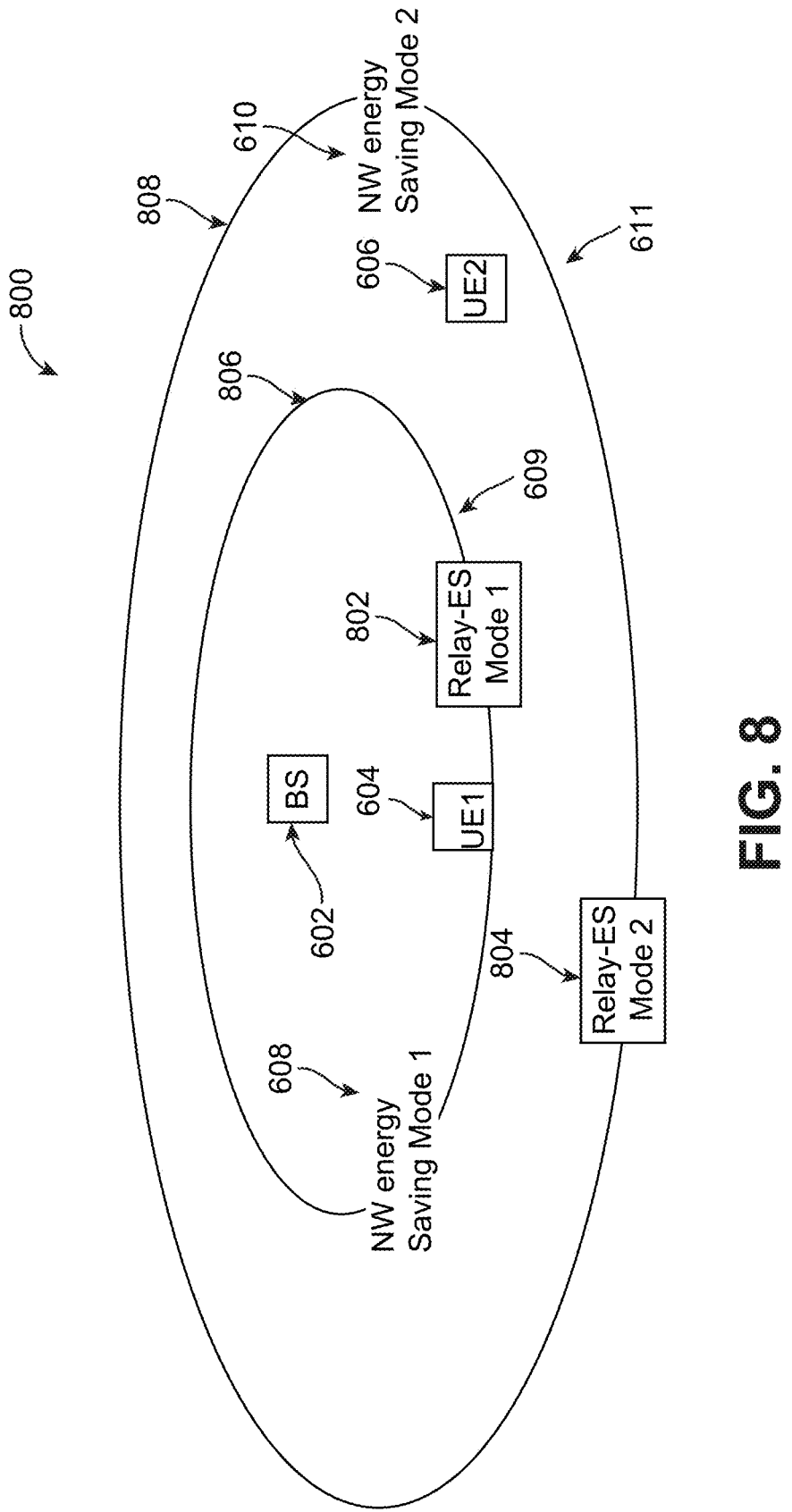
FIG. 8 is a diagram illustrating a communication network with multiple relay nodes which can be used to describe transitioning from one energy state mode to another energy state mode, in accordance with some examples.

FIG. 8 is a diagram 800 illustrating a communication network with multiple relay nodes 802, 804 which can be used to describe transitioning from one energy state mode to another energy state mode. A base station 602 can communicate with a UE 604 within the first ring 806 in a network energy state mode 1 608. The network energy state mode 1 608 is a lower energy state mode in which there is relatively less energy used by the network to communicate with UEs as compared to the network energy state mode 2 610. The UE 606 could not communicate with the base station 602 in this mode. This mode could relate to the light sleep mode 704 or the deep sleep mode 708 of FIG. 7.

In the network energy state mode 2 610, the network uses more energy (e.g., corresponding to the legacy operation 702 of FIG. 7). In this scenario, the base station 602 can communicate with UE 606 up to the point at which the communication range 808 ends. The proposals disclosed herein enable the base station 602 to communicate through one or more relay nodes 802, 804 with the more distance UE 606 during a low energy state. The relay nodes 802, 804 as noted above can be represented by a number of different components or devices, including other UEs. The network can assign one or more relay nodes 802, 804 to act as relays or repeaters for UEs 606 for the certain energy state modes. Each active relay node 802, 804 during a lower energy state 608 can frequently or periodically collect information about the surrounding UEs 606 and send reports to the base station 602. The data can be collected frequently, periodically, or can be collected at times based on traffic usage, or the number of detected UEs 606, or based on the movement of UEs (e.g., their speed, direction, acceleration, or combination of this data), historical data, a predicted volume of activity, or some other factors. The timing for collection can be dynamic based on one or more of these factors.

The data can be reported from a relay node 802, 804 to the base station 602 also at a dedicated time or at a dynamic time based on one or more of the factors mentioned above. For example, at times with many UEs communication a large amount of data through a relay node 802, 804, the relay node may report data to the base station 602 on a more regular interval. The data can include a number of UEs 606 that are within communication range of the relay node 802, 804, the position or location of the UEs 606, pathloss data associated with the UEs 606, signal strength or quality (e.g., reference signal received power (RSRP), reference signal received quality (RSRQ), signal-to-interference and noise ratio (SINR), etc.) of signals received from the UEs 606, a type of data of the UEs 606, a priority or quality (e.g., quality of service (QOS) information) associated with the UEs 606, and/or other information. The pathloss can be measured from the physical data shared channel demodulation reference signal (PDSCH DMRS) or a dedicated reference signal (RS) or synchronization signal block (SSB). Any one or more of this data can be used for determining on a dynamic basic the collection timing as well as the reporting timing from a relay node 802, 804 to the base station 602.

The data may also be coordinated between two relay nodes 802, 804. For example, if the relay node 802 is fixed (e.g., a base station or CU, DU, etc. of the base station, a roadside unit (RSU), or other fixed network device) and relay node 804 is a UE (and is thus mobile), then the data may be aggregated to include all the UEs around the relay node 802 and the relay node 804 rather than the UEs around just one of the relay nodes. The collected data may also be aggregated before sending. For example, if the relay node 804 is a UE and is mobile, it may move close to the other relay node 802. These two relay nodes 802, 804 can coordinate the data and one or both of them may transmit the report to the base station 602.

When the relay node 804 is a UE and is thus likely moving, its movement, acceleration, and/or vector of direction can also be included in the report which can help with the transition process between energy modes. For example, assume relay node 802 is a UE and is moving towards the base station 602 while relaying data from UE 606. At some point, the relay node 802 might be at the base station 602 and thus using it for communication with the UE 606 will not necessarily save any energy. In this case, the movement of the relay node 802 and its direction and timing can cause the system to transition from a lower energy state 608 to a high energy or legacy operation state 702 in order to maintain the communication link with the UE 606.

In one example, the relay nodes 802, 804 are sidelink devices in that they use device-to-device communication protocols to communicate with UEs. For example, the UEs 606 can send information to and from the relay nodes 802, 804 via one or more communication protocols. The L1 communication protocol can be used and can include one or more of sidelink control information (SCI), sidelink wake-up signal (SL-WUS) and a dedicated physical sidelink shared channel (PSSCH). An L2 communication protocol can be used and can include a device-to-device medium access control element (MAC-CE). Another protocol is the L3 communication protocol which can include PC5 radio resource control (RRC). The PC5 protocol is a radio frequency direction communication protocol for low latency communication between two devices at typically a short range such as below a kilometer. The communication between relay nodes 802, 804 and UEs 606 can use any one or more of these protocols or other protocols as well.

In another aspect, the network can dedicate new resources for communication between the relay node 802, 804 and the UE 606. This can occur after a measurement of position or for signal quality. The dedicated resources can be for communication between devices and/or for reporting from the relay node 802, 804 to the base station 602. The reporting can allow sharing such information using the L1/L2/L3 configuration for signaling and indications. These can be called different sidelink (SL) modes of use, which can be chosen based on different alternate resource pools. The choice of the SL mode can be determined either from the base station 602, a relay node 802, 804 or the UE 606.

The UE 606 can indicate its power usage, and/or QoS/type of data is it using. The base station 602 can transmit or communicate an assignment of resources to one or more relay nodes 802, 804 to collect information using the L1/L2/L3 signaling approach. For example, depending on what type of device the relay node 802, 804 is (e.g., IAB, UE, fixed station or other device type), there might be a different allocation or resources to collect data using a particular communication protocol. The allocation of resources can be based on one or more of the number of out-of-coverage UEs 606, priority of UEs 606, a QoS assigned to one or more UEs 606 reported by relay nodes 802, 804 and usage in a low energy state mode 608. The network can transition based on these factors to a high energy state mode 610. This can mainly be because the UEs 606 might have a higher priority or QoS traffic (e.g., such as live video conference streaming). In another aspect, there might be a larger number of UEs 606 that are out-of-coverage and thus more resources need to be assigned to handle the data.

In one aspect, before transitioning to a low energy state, the base station 602 can indicate to one or more of the UEs 606 to stay connected with the base station 602 via the radio resource protocol (RRC) or direct communication with the base station 602. The network can pause or freeze inactive or idle UEs 606 while maintaining a connection with active UEs. In this case, there may be, for example, five UEs in the distant communication range 808 in energy mode 2 610. However, when transitioning to the low energy mode 608, the network may still maintain an RRC connection to one or more UEs. The choice can be activity rate, QoS requirements, priority of data, time of day, or a predicted future need for data for the respective UE. For example, if historical data indicates that the UE is about to use a lot of high priority data, then the network may utilize that historical data to indicate to that UE to stay connected while others will be disconnected or transition to a relay node 802, 804.

In another aspect, the relay node 802, 804 can received dedicated resources for the available UEs 606 before moving from a low energy state mode 608 to a high energy state mode 610. This this regard, the transition enables these UEs 606 to quickly perform an initial network access rand access procedure (RACH). This can be helpful if a timing advance (TA) needs to be corrected. The timing advance is used to control the uplink transmission timing of the UE 606.

In another example, relay nodes 802, 804 can be off during the new high energy state mode 610 or they can cover part of the time with full bandwidth support with lower power and replaying capability. In another aspect, the relay nodes 802, 804 can cover part of the time with partial bandwidth or bandwidth parts (BWP) support with lower power and relaying capability. BWP is a feature for dynamically adapting the carrier bandwidth and numerology in which the UE 606 operates.

In another aspect, the timing between moving to a new energy state and turning off the relay node 802, 804 or to support a lower time or bandwidth requirements can be based on a timer after receiving the indication that the network is moving to a new energy stat in a certain period of time (e.g., 3 seconds) or in a certain number of time units.

For instance, the relay node 802 can transition to a low power energy state and/or to turn off upon expiration of the timer. In some aspects, the timing can alternatively or additionally be based on an indicated time through L1, L2, and/or L3 signaling to or from the base station 602.

In one example, when the base station 602 is operating in a low energy state mode, the relay node 802 can relay information data between the base station 602 and at least one out-of-coverage UE (e.g., that is out of the communication range 609 of the base station 602 but in coverage of the relay node 802), such as the UE device 606. The relay node 802 can collect or obtain information associated with the at least one UE (e.g., UE 606) in a communication range with the base station 602 and transmit a report including the information to a base station 602. In some cases, the relay 802 can periodically collect the information. The relay 802 can transmit the report at one or more dedicated times to the base station 602 or may transmit the report at a dynamically changing times.

FIG. 9 is a flow diagram illustrating an example of a method 900 for wireless communications. In some cases, the method 900 can be performed based on a transition of a base station from one energy mode to another energy mode of a communication network. For instance, the transition can be from a low energy state mode to a high energy state mode. The process 900 can be performed by a network device such as a base station (e.g., a gNB, an eNB, or other base station), a portion of the base station (e.g., a central unit (CU), a distributed unit (DU), a radio unit (RU), a Near-Real Time (Near-RT) RAN Intelligent Controller (RIC), or a Non-Real Time (Non-RT) RIC of the base station), or a component of the base station (e.g., a chipset, a processor, etc.). The network device can include a base station, a portion of the base station (e.g., a CU, DU, RU, etc. of the base station), or other type of network device. The operations of the process 900 may be implemented as software components that are executed and run on one or more processors (e.g., processor 1110 of FIG. 11 and/or other processor(s)). Further, the transmission and reception of signals by the wireless communications device in the process 900 may be enabled, for example, by one or more antennas and/or one or more transceivers (e.g., wireless transceiver(s)).

At block 902, the network device (or component thereof) can transmit, to a relay network device, an assignment of network resources for at least one of obtaining information associated with at least one user equipment (UE)) in a communication range of the relay network device and out of a communication range of the network device when operating in a first energy state mode. The relay network device can be, can include, or can be a part of a base station or portion of a base station, an integrated access and backhauls (IABs), reconfigurable intelligent surfaces (RISs), UEs to act as relay for other UEs 606 for certain energy state modes, low-cost amplifier and forward (AF) and decode and forward (DF) units, relays or repeaters, or other type of device.

In some aspects, the information includes a number of UEs that are in the communication range with the relay network device, a respective position of each respective UE in the communication range of the relay network device, a respective pathloss associated with each respective UE in the communication range of the relay network device, a respective signal strength or quality of at least one signal received from a respective UE in the communication range of the relay network device, a respective type of data associated with each respective UE in the communication range of the relay network device, a priority or quality associated with the respective type of data of each respective UE in the communication range of the relay network device, any combination thereof, and/or other information. In some cases, the respective signal strength or quality of at least one signal includes a reference signal received power (RSRP), a reference signal received quality (RSRQ), a signal-to-interference and noise ratio (SINR) of the at least one signal received from a respective UE in the communication range of the relay network device, any combination thereof, and/or other measure of signal strength or quality.

At block 904, the network device (or component thereof) can transmit a report including the information and/or associated with the at least one UE.

At block 906, the network device (or component thereof) can receive, when operating in the first energy state mode, a report including the information from the relay network device. For example, the network device (or component thereof) can receive the report at one or more dedicated times from the relay network device.

In some aspects, the network device (or component thereof) can transition from the first energy state mode to a second energy state mode based on at least one of a number of UEs that are out of the communication range of the network device or the at least one UE having a high priority or quality of service requirement.

The network device (or component thereof) can output, for transmission to the relay network device, an assignment of dedicated random-access channel (RACH) network resources for random access of the at least one UE with the network device when operating in a second energy state mode. The first energy state mode can include a low energy state mode and the second energy state mode comprises a high energy state mode.

The network device (or component thereof) can, based on a transition of the network device to the first energy state mode, output, for transmission to the at least one UE, an indication to remain connected to the network device.

FIG. 10 illustrates a flow diagram associated with a method 100 for wireless communications. The process 1000 can be performed by a relay network device or relay node, such as an base station (e.g., a gNB), a fixed station that uses limited energy relative to a base station, a portion of a base station (e.g., a CU, a DU, a RU, a Near-RT RIC, or a Non-RT RIC of the base station), a UE, an Integrated Access and Backhaul (IAB), a non-RAN node, low-cost amplifier and forward (AF) and decode and forward (DF) units, relays or repeaters, or other network device or network entity. In some cases, the relay node can act as a repeater, or a component of any such device (e.g., a chipset, a processor, etc.). The operations of the process 1000 may be implemented as software components that are executed and run on one or more processors (e.g., the controller/processor 240 of FIG. 2, the controller/processor 280 of FIG. 2, the processor(s) 484 of FIG. 4, the processor 1110 of FIG. 11, and/or other processor(s)). Further, the transmission and reception of signals by the wireless communications device in the process 1000 may be enabled, for example, by one or more antennas and/or one or more transceivers such as wireless transceiver(s) (e.g., the transmit processor 220 of FIG. 2, the TX MIMO processor 230 of FIG. 2, the MOD/DEMOD 232a through 232t of FIG. 2, the receive processor 238 of FIG. 2, the MIMO detector 236 of FIG. 2, the receive processor 258 of FIG. 2, the MIMO detector 256 of FIG. 2, the DEMOD/MOD 252a through 254r of FIG. 2, the transmit processor 264 of FIG. 2, the TX MIMO processor 266 of FIG. 2, the wireless transceiver(s) 478 of FIG. 4, the antenna 487 of FIG. 4, the communication interface 1140 of FIG. 11, and/or other antenna(s) and/or transceiver(s)).

At block 1002, the network device (or component thereof) can determine that at least one user equipment (UE) is in a communication range of the relay network device and out of a communication range of a network device (e.g., a base station such as a gNB or a portion of the base station, such as a CU, DU, RU, etc. of the base station) operating in a first energy state mode.

At block 1002, the relay network device (or component thereof) can obtain information associated with the at least one UE. In some cases, the relay network device (or component thereof) can periodically obtain the information associated with the at least one UE. In some aspects, the information includes a number of UEs that are in the communication range with the relay network device, a respective position of each respective UE in the communication range of the relay network device, a respective pathloss associated with each respective UE in the communication range of the relay network device, a respective signal strength or quality of at least one signal received from a respective UE in the communication range of the relay network device, a respective type of data associated with each respective UE in the communication range of the relay network device, a priority or quality associated with the respective type of data of each respective UE in the communication range of the relay network device, any combination thereof, and/or other information. In some cases, the respective signal strength or quality of at least one signal incudes a reference signal received power (RSRP), a reference signal received quality (RSRQ), or a signal-to-interference and noise ratio (SINR) of the at least one signal received from a respective UE in the communication range of the relay network device, any combination thereof, and/or other measure of signal strength or quality.

At block 1004, the relay network device (or component thereof) can transmit, to the network device operating in the first energy state mode, a report including the information. In some aspects, the relay network device (or component thereof) can transmit the report at one or more dedicated times to the network device.

As noted above, in some cases the relay network device can be a relay UE. In such cases, the relay network device (or component thereof) can communicate with the at least one UE using at least one of layer 1 (L1) signaling, layer 2 (L2) signaling, or layer 3 (L3) signaling. In some aspects, the L1 signaling includes sidelink control information (SCI), a sidelink wake-up signal (SL-WUS), a dedicated physical sidelink shared channel (PSSCH), any combination thereof, and/or other signaling. In some aspects, L2 signaling includes a sidelink medium access control-control element (MAC-CE). In some aspects, the L3 signaling includes sidelink radio resource control (RRC) signaling.

In some examples, the relay network device (or component thereof) can receive, from the network device, an assignment of network resources for at least one of obtaining the information or transmitting the report. In some cases, the relay network device (or component thereof) can determine, using a random access (RA) procedure, resources to use for at least one of obtaining the information or transmitting the report.

In some aspects, the relay network device (or component thereof) can receive an indication of the network device transitioning to a second energy state mode based on at least one of a number of UEs that are out of the communication range of the network device or the at least one UE having a high priority or quality of service requirement. In some cases, based on transition of the network device from the first energy state mode to a second energy state mode, the relay network device (or component thereof) can transition to low power operation. The relay network device (or component thereof) can communicate, while in the low power operation, with the at least one UE using a full bandwidth. In some examples, the first energy state mode is a low energy state mode and the second energy state mode is a high energy state mode. In some cases, the relay network device (or component thereof) can transition the relay network device to an off state or to a lower power operational state based on transition of the network device from the low energy state mode to the high energy state mode.

In some aspects, the relay network device (or component thereof) can receive an assignment of dedicated random-access channel (RACH) network resources for random access of the at least one UE with the relay network device when operating in a high energy state mode.

In some cases, based on transition of the relay network device from the first energy state mode to a second energy state mode, the relay network device (or component thereof) can transition to low power operation. The relay network device (or component thereof) can communicate with the at least one UE using a partial bandwidth or one or more particular bandwidth parts (BWPs).

In some aspects, the relay network device (or component thereof) can receive an indication of the network device transitioning to a second energy state mode. The the relay network device (or component thereof) can transition, based at least on the indication, to an off state or to a low power operation.

In some examples, the relay network device (or component thereof) can transition to the off state or the lower pow operation upon expiration of a timer. In some cases, the relay network device (or component thereof) can receive, from the network device, an indication of a transition time and can transition to the off state or the low power operation at the transition time. In some aspects, the relay network device (or component thereof) can receive the indication of the transition time from the network device via L1 signaling, L2 signaling, or L3 signaling.

As noted above, the processes described herein (e.g., process 900, process 1000, and/or other process described herein) may be performed by a computing device or apparatus (e.g., a network node such as a UE, base station, a portion of a base station, etc.). For instance, as noted above, the process 900 may be performed by a network device and the process 1000 may be performed by a relay network device. In another example, the process 900 and/or the process 1000 may be performed by a computing device with the computing system 1100 shown in FIG. 11. For instance, a wireless communication device with the computing architecture shown in FIG. 11 may include the components of the UE and may implement the operations of FIG. 9 and/or FIG. 10.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x)

standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The process 900 and the process 1000 are illustrated as a logical flow diagrams, the operation of which represent a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the process 900, the process 1000, and/or other process described herein, may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 11:
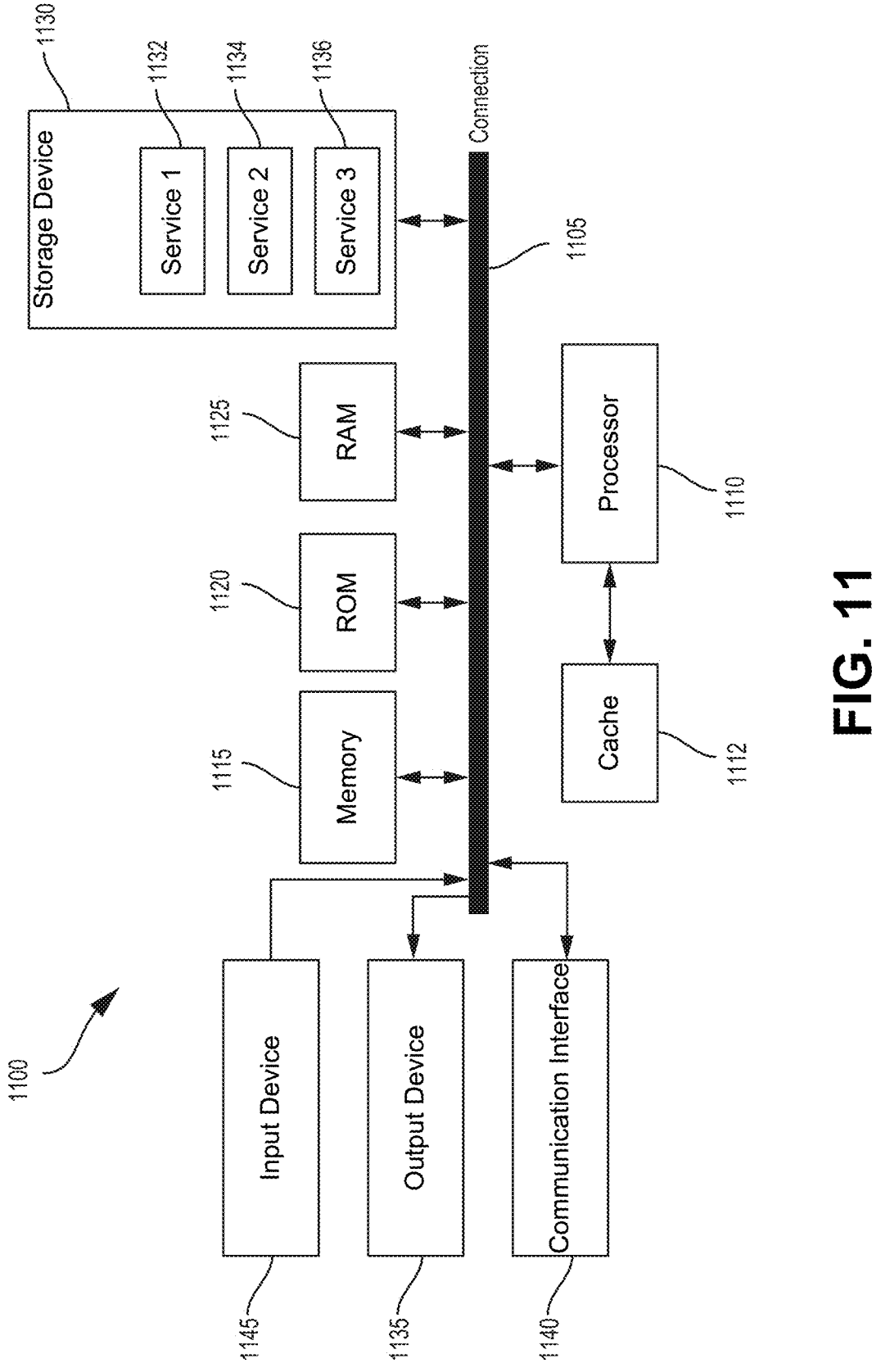
FIG. 11 is a block diagram illustrating an example of a computing system, in accordance with some examples.

FIG. 11 is a diagram illustrating an example of a system for implementing certain aspects of the present technology. In particular, FIG. 11 illustrates an example of computing system 1100, which may be for example any computing device making up internal computing system, a remote computing system, a camera, or any component thereof in which the components of the system are in communication with each other using connection 1105. Connection 1105 may be a physical connection using a bus, or a direct connection into processor 1110, such as in a chipset architecture. Connection 1105 may also be a virtual connection, networked connection, or logical connection.

In some aspects, computing system 1100 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 1100 includes at least one processing unit (CPU or processor) 1110 and connection 1105 that communicatively couples various system components including system memory 1115, such as read-only memory (ROM) 1120 and random access memory (RAM) 1125 to processor 1110. Computing system 1100 may include a cache 1115 of high-speed memory connected directly with, in close proximity to, or integrated as part of processor 1110.

Processor 1110 may include any general-purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which may represent any number of input mechanisms, such as a microphone for speech, a touch-sensitive screen for gesture or graphical input, keyboard, mouse, motion input, speech, etc. Computing system 1100 may also include output device 1135, which may be one or more of a number of output mechanisms. In some instances, multimodal systems may enable a user to provide multiple types of input/output to communicate with computing system 1100.

Computing system 1100 may include communications interface 1140, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory StickR: card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EE-PROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/Re-RAM), phase change memory (PCM), spin transfer torque RAM (STT-RAM), another memory chip or cartridge, and/ or a combination thereof.

The storage device 1130 may include software services, servers, services, etc., that when the code that defines such software is executed by the processor 1110, it causes the system to perform a function. In some aspects, a hardware service that performs a particular function may include the software component stored in a computer-readable medium in connection with the necessary hardware components, such as processor 1110, connection 1105, output device 1135, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Illustrative aspects of the disclosure include:

Aspect 1. A relay network device for wireless communication, comprising: at least one memory; and at least one processor coupled to at least one memory and configured to: determine that at least one user equipment (UE) is in a communication range of the relay network device and out of a communication range of a network device operating in a first energy state mode: obtain information associated with the at least one UE; and transmit, to the network device operating in the first energy state mode, a report comprising the information.

Aspect 2. The relay network device of Aspect 1, wherein the at least one processor is configured to periodically obtain the information associated with the at least one UE.

Aspect 3. The relay network device of Aspect 1 or 2, wherein the at least one processor is configured to transmit the report at one or more dedicated times to the network device.

Aspect 4. The relay network device of any of Aspects 1 to 3, wherein the information comprises at least one of a number of UEs that are in the communication range with the relay network device, a respective position of each respective UE in the communication range of the relay network device, a respective pathloss associated with each respective UE in the communication range of the relay network device, a respective signal strength or quality of at least one signal received from a respective UE in the communication range of the relay network device, a respective type of data associated with each respective UE in the communication range of the relay network device, or a priority or quality associated with the respective type of data of each respective UE in the communication range of the relay network device.

Aspect 5. The relay network device of any of Aspects 1 to 4, wherein the respective signal strength or quality of at least one signal comprises at least one of a reference signal received power (RSRP), a reference signal received quality (RSRQ), or a signal-to-interference and noise ratio (SINR) of the at least one signal received from a respective UE in the communication range of the relay network device.

Aspect 6. The relay network device of any of Aspects 1 to 5, wherein the relay network device comprises one of a relay UE and a relay base station.

Aspect 7. The relay network device of any of Aspects 1 to 6, wherein the relay network device comprises a relay UE, and wherein the at least one processor is configured to: communicate with the at least one UE using at least one of layer 1 (L1) signaling, layer 2 (L2) signaling, or layer 3 (L3) signaling.

Aspect 8. The relay network device of Aspect 7, wherein: the L1 signaling comprises at least one of sidelink control information (SCI), a sidelink wake-up signal (SL-WUS), or a dedicated physical sidelink shared channel (PSSCH): the L2 signaling comprises a sidelink medium access control-control element (MAC-CE); and the L3 signaling comprises sidelink radio resource control (RRC) signaling.

Aspect 9. The relay network device of any of Aspects 1 to 8, wherein the at least one processor is further to receive, from the network device, an assignment of network resources for at least one of obtaining the information or transmitting the report.

Aspect 10. The relay network device of any of Aspects 1 to 9, wherein the at least one processor is further configured to determine, using a random access (RA) procedure, resources to use for at least one of obtaining the information or transmitting the report.

Aspect 11. The relay network device of any of Aspects 1 to 10, wherein the at least one processor is configured to receive an indication of the network device transitioning to a second energy state mode based on at least one of a number of UEs that are out of the communication range of the network device or the at least one UE having a high priority or quality of service requirement.

Aspect 12. The relay network device of Aspect 11, wherein, based on transition of the network device from the first energy state mode to a second energy state mode, the at least one processor is configured to: transition to low power operation; and communicate, while in the low power operation, with the at least one UE using a full bandwidth.

Aspect 13. The relay network device of Aspect 12, wherein the first energy state mode comprises a low energy state mode and wherein the second energy state mode comprises a high energy state mode.

Aspect 14. The relay network device of Aspect 13, wherein the at least one processor is configured to transition the relay network device to an off state or to a lower power operational state based on transition of the network device from the low energy state mode to the high energy state mode.

Aspect 15. The relay network device of any of Aspects 1 to 12, wherein the at least one processor is configured to receive an assignment of dedicated random-access channel (RACH) network resources for random access of the at least one UE with the relay network device when operating in a high energy state mode.

Aspect 16. The relay network device of any of Aspects 1 to 15, wherein, based on transition of the relay network device from the first energy state mode to a second energy state mode, the at least one processor is configured to: transition to low power operation; and communicate with the at least one UE using a partial bandwidth or one or more particular bandwidth parts (BWPs).

Aspect 17. The relay network device of any of Aspects 1 to 16, wherein the at least one processor is configured to: receive an indication of the network device transitioning to a second energy state mode; and transition, based at least on the indication, to an off state or to a low power operation.

Aspect 18. The relay network device of Aspect 17, wherein the at least one processor is configured to transition to the off state or the lower pow operation upon expiration of a timer.

Aspect 19. The relay network device of Aspect 17, wherein the at least one processor is configured to: receive, from the network device, an indication of a transition time; and transition to the off state or the low power operation at the transition time.

Aspect 20. The relay network device of Aspect 19, wherein the at least one processor is configured to receive the indication of the transition time from the network device via L1 signaling, L2 signaling, or L3 signaling.

Aspect 21. A network device for wireless communication in a network, comprising: at least one memory; and at least one processor coupled to at least one memory and configured to: transmit, to a relay network device, an assignment of network resources for at least one of obtaining information associated with at least one user equipment (UE) in a communication range of the relay network device and out of a communication range of the network device when operating in a first energy state mode or transmitting a report associated with the at least one UE; and receive, when operating in the first energy state mode, a report comprising the information from the relay network device.

Aspect 22. The network device of Aspect 21, wherein the at least one processor is configured to receive the report at one or more dedicated times from the relay network device.

Aspect 23. The network device of Aspect 21 or Aspect 22, wherein the information comprises at least one of a number of UEs that are in the communication range with the relay network device, a respective position of each respective UE in the communication range of the relay network device, a respective pathloss associated with each respective UE in the communication range of the relay network device, a respective signal strength or quality of at least one signal received from a respective UE in the communication range of the relay network device, a respective type of data associated with each respective UE in the communication range of the relay network device, or a priority or quality associated with the respective type of data of each respective UE in the communication range of the relay network device.

Aspect 24. The network device of any of Aspects 21 to 23, wherein the respective signal strength or quality of at least one signal comprises at least one of a reference signal received power (RSRP), a reference signal received quality (RSRQ), or a signal-to-interference and noise ratio (SINR) of the at least one signal received from a respective UE in the communication range of the relay network device.

Aspect 25. The network device of any of Aspects 21 to 24, wherein the at least one processor is configured to transition from the first energy state mode to a second energy state mode based on at least one of a number of UEs that are out of the communication range of the network device or the at least one UE having a high priority or quality of service requirement.

Aspect 26. The network device of any of Aspects 21 to 25, wherein the at least one processor is configured to output, for transmission to the relay network device, an assignment of dedicated random-access channel (RACH) network resources for random access of the at least one UE with the network device when operating in a second energy state mode.

Aspect 27. The network device of Aspect 26, wherein the first energy state mode comprises a low energy state mode and wherein the second energy state mode comprises a high energy state mode.

Aspect 28. The network device of any of Aspects 21 to 27, wherein, based on a transition of the network device to the first energy state mode, the at least one processor is configured to output, for transmission to the at least one UE, an indication to remain connected to the network device.

Aspect 29. A method of wireless communications performed at a relay network device, the method comprising: determining that at least one user equipment (UE) is in a communication range of the relay network device and out of a communication range of a network device operating in a first energy state mode: obtaining information associated with the at least one UE; and transmitting, to the network device operating in the first energy state mode, a report comprising the information.

Aspect 30. The method of Aspect 29, further comprising one or more operations according to any of Aspects 1 to 20.

Aspect 31. A method of wireless communication performed at a network device, the method comprising: transmitting, to a relay network device, an assignment of network resources for at least one of obtaining information associated with at least one user equipment (UE) in a communication range of the relay network device and out of a communication range of the network device when operating in a first energy state mode or transmitting a report associated with the at least one UE; and receiving, when operating in the first energy state mode, a report comprising the information from the relay network device.

Aspect 32. The method of Aspect 31, further comprising one or more operations according to any of Aspects 21 to 28.

Aspect 31. A non-transitory computer-readable medium having stored thereon instructions that, when executed by one or more processors, cause the one or more processors to perform operations according to any of Aspects 1 to 32.

Aspect 32. An apparatus for wireless communication, the apparatus including one or more means for performing operations according to any of Aspects 1 to 32.

What is claimed is:
1. A relay network device for wireless communication, comprising:
at least one memory; and
at least one processor coupled to at least one memory and configured to:
determine that at least one user equipment (UE) is in a communication range of the relay network device and out of a communication range of a network device based on the network device operating in a first energy state mode of a plurality of energy state modes, the plurality of energy state modes including the first energy state mode and a second energy state mode;
obtain information associated with the at least one UE based on a determination that the network device is operating in the first energy state mode; and
transmit, to the network device operating in the first energy state mode, a report comprising the information.

2. The relay network device of claim 1, wherein the at least one processor is configured to periodically obtain the information associated with the at least one UE.

3. The relay network device of claim 1, wherein the at least one processor is configured to transmit the report at one or more dedicated times to the network device.

4. The relay network device of claim 1, wherein the information comprises at least one of a number of UEs that are in the communication range with the relay network device, a respective position of each respective UE in the communication range of the relay network device, a respective pathloss associated with each respective UE in the communication range of the relay network device, a respective signal strength or quality of at least one signal received from a respective UE in the communication range of the relay network device, a respective type of data associated with each respective UE in the communication range of the relay network device, or a priority or quality associated with the respective type of data of each respective UE in the communication range of the relay network device.

5. The relay network device of claim 4, wherein the respective signal strength or quality of at least one signal comprises at least one of a reference signal received power (RSRP), a reference signal received quality (RSRQ), or a signal-to-interference and noise ratio (SINR) of the at least one signal received from a respective UE in the communication range of the relay network device.

6. The relay network device of claim 1, wherein the relay network device comprises one of a relay UE and a relay base station.

7. The relay network device of claim 1, wherein the relay network device comprises a relay UE, and wherein the at least one processor is configured to:
communicate with the at least one UE using at least one of layer 1 (L1) signaling, layer 2 (L2) signaling, or layer 3 (L3) signaling.

8. The relay network device of claim 7, wherein:
the L1 signaling comprises at least one of sidelink control information (SCI), a sidelink wake-up signal (SL-WUS), or a dedicated physical sidelink shared channel (PSSCH);
the L2 signaling comprises a sidelink medium access control-control element (MAC-CE); and
the L3 signaling comprises sidelink radio resource control (RRC) signaling.

9. The relay network device of claim 1, wherein the at least one processor is further to receive, from the network device, an assignment of network resources for at least one of obtaining the information or transmitting the report.

10. The relay network device of claim 1, wherein the at least one processor is further configured to determine, using a random access (RA) procedure, resources to use for at least one of obtaining the information or transmitting the report.

11. The relay network device of claim 1, wherein the at least one processor is configured to receive an indication of the network device transitioning to the second energy state mode based on at least one of a number of UEs that are out of the communication range of the network device or the at least one UE having a high priority or quality of service requirement.

12. The relay network device of claim 11, wherein, based on transition of the network device from the first energy state mode to the second energy state mode, the at least one processor is configured to:
transition to low power operation; and
communicate, while in the low power operation, with the at least one UE using a full bandwidth.

13. The relay network device of claim 11, wherein the first energy state mode comprises a low energy state mode and wherein the second energy state mode comprises a high energy state mode.

14. The relay network device of claim 13, wherein the at least one processor is configured to transition the relay network device to an off state or to a lower power operational state based on transition of the network device from the low energy state mode to the high energy state mode.

15. The relay network device of claim 1, wherein the at least one processor is configured to receive an assignment of dedicated random-access channel (RACH) network resources for random access of the at least one UE with the relay network device when operating in a high energy state mode.

16. The relay network device of claim 1, wherein, based on transition of the relay network device from the first energy state mode to the second energy state mode, the at least one processor is configured to:
transition to low power operation; and communicate with the at least one UE using a partial bandwidth or one or more particular bandwidth parts (BWPs).

17. The relay network device of claim 1, wherein the at least one processor is configured to:
receive an indication of the network device transitioning to the second energy state mode; and
transition, based at least on the indication, to an off state or to a low power operation.

18. The relay network device of claim 17, wherein the at least one processor is configured to transition to the off state or the low power operation upon expiration of a timer.

19. The relay network device of claim 17, wherein the at least one processor is configured to:
receive, from the network device, an indication of a transition time; and
transition to the off state or the low power operation at the transition time.

20. The relay network device of claim 19, wherein the at least one processor is configured to receive the indication of the transition time from the network device via L1 signaling, L2 signaling, or L3 signaling.

21. A network device for wireless communication in a network, comprising:
at least one memory; and
at least one processor coupled to at least one memory and configured to:
transmit, to a relay network device, an assignment of network resources for obtaining information associated with at least one user equipment (UE) in a communication range of the relay network device and out of a communication range of the network device based on the network device operating in a first energy state mode of a plurality of energy state modes, the plurality of energy state modes including the first energy state mode and a second energy state mode; and
receive, when operating in the first energy state mode, a report comprising the information from the relay network device.

22. The network device of claim 21, wherein the at least one processor is configured to receive the report at one or more dedicated times from the relay network device.

23. The network device of claim 21, wherein the information comprises at least one of a number of UEs that are in the communication range with the relay network device, a respective position of each respective UE in the communication range of the relay network device, a respective pathloss associated with each respective UE in the communication range of the relay network device, a respective signal strength or quality of at least one signal received from a respective UE in the communication range of the relay network device, a respective type of data associated with each respective UE in the communication range of the relay network device, or a priority or quality associated with the respective type of data of each respective UE in the communication range of the relay network device.

24. The network device of claim 23, wherein the respective signal strength or quality of at least one signal comprises at least one of a reference signal received power (RSRP), a reference signal received quality (RSRQ), or a signal-to-interference and noise ratio (SINR) of the at least one signal received from a respective UE in the communication range of the relay network device.

25. The network device of claim 21, wherein the at least one processor is configured to transition from the first energy state mode to the second energy state mode based on at least one of a number of UEs that are out of the communication range of the network device or the at least one UE having a high priority or quality of service requirement.

26. The network device of claim 21, wherein the at least one processor is configured to output, for transmission to the relay network device, an assignment of dedicated random-access channel (RACH) network resources for random access of the at least one UE with the network device when operating in the second energy state mode.

27. The network device of claim 26, wherein the first energy state mode comprises a low energy state mode and wherein the second energy state mode comprises a high energy state mode.

28. The network device of claim 21, wherein, based on a transition of the network device to the first energy state mode, the at least one processor is configured to output, for transmission to the at least one UE, an indication to remain connected to the network device.

29. A method of wireless communications performed at a relay network device, the method comprising:

determining that at least one user equipment (UE) is in a communication range of the relay network device and out of a communication range of a network device based on the network device operating in a first energy state mode of a plurality of energy state modes, the plurality of energy state modes including the first energy state mode and a second energy state mode;

obtaining information associated with the at least one UE based on a determination that the network device is operating in the first energy state mode; and transmitting, to the network device operating in the first energy state mode, a report comprising the information.

30. A method of wireless communication performed at a network device in a network, the method comprising:

transmitting, to a relay network device, an assignment of network resources for obtaining information associated with at least one user equipment (UE) in a communication range of the relay network device and out of a communication range of the network device based on the network device operating in a first energy state mode of a plurality of energy state modes, the plurality of energy state modes including the first energy state mode and a second energy state mode; and receiving, when operating in the first energy state mode, a report comprising the information from the relay network device.

\* \* \* \* \*